(12) United States Patent
Chauhan et al.

(10) Patent No.: US 12,230,110 B2
(45) Date of Patent: Feb. 18, 2025

(54) QUEUE MANAGEMENT FOR PRE-STAGED TRANSACTIONS AT ULTRA-WIDE ENABLED ATMS

(71) Applicant: Bank of America Corporation, Charlotte, NC (US)

(72) Inventors: Sandeep Kumar Chauhan, Hyderabad (IN); Udaya Kumar Raju Ratnakaram, Telangana (IN); Nandini Rathaur, Hyderabad (IN); Puneetha Polasa, Telangana (IN); Vibhu Srivastava, Sangareddy (IN)

(73) Assignee: Bank of America Corporation, Charlotte, NC (US)

( * ) Notice: Subject to any disclaimer, the term of this patent is extended or adjusted under 35 U.S.C. 154(b) by 90 days.

(21) Appl. No.: 17/369,120

(22) Filed: Jul. 7, 2021

(65) Prior Publication Data

US 2023/0012424 A1 Jan. 12, 2023

(51) Int. Cl.
  G07F 19/00 (2006.01)
  H04W 4/029 (2018.01)
  H04W 4/38 (2018.01)

(52) U.S. Cl.
  CPC .......... *G07F 19/209* (2013.01); *G07F 19/206* (2013.01); *G07F 19/211* (2013.01); *H04W 4/029* (2018.02); *H04W 4/38* (2018.02)

(58) Field of Classification Search
  CPC .... G07F 19/209; G07F 19/206; G07F 19/207; H04W 4/029; H04W 4/025
  See application file for complete search history.

(56) References Cited

U.S. PATENT DOCUMENTS 9,098,961 B1 * 8/2015 Block ................... G07F 19/201
9,418,358 B2    8/2016 Johnson et al.
(Continued)

FOREIGN PATENT DOCUMENTS

EP    2587432 A1    5/2013

OTHER PUBLICATIONS

Ultra -Wideband Its' ultra-everything and the possibilities are endless, Qorvo, https://www.qorvo.com/resources/d/qorvo-ultra-wideband-brochure (Year: 2021).*

(Continued)

*Primary Examiner* — Daniel I Walsh
(74) *Attorney, Agent, or Firm* — Banner & Witcoff, Ltd.

(57) ABSTRACT

A queue management ultra-wideband (UWB) automated teller machine (ATM) transaction pre-staging systems and methods for use with an ATM server, at least one UWB-enabled wireless portable electronic device, and a plurality of UWB-enabled ATMs are disclosed. Transactions are pre-staged by the UWB-enabled devices with the ATM servers. Queue wait times at each UWB-enabled ATM can be determined based on how many transactions have been scheduled for the ATM, how many customers are currently waiting at the ATM, and what currency resources are required by the pre-staged transactions. Geographical distances between the user and the ATMs can be determined. Based on historical customer ATM usage preferences, the distance to various ATMs, and queue wait times, the ATM server may make recommendations regarding which ATM would be optimal for the customer to use to complete the pre-staged transaction.

19 Claims, 14 Drawing Sheets

(56) References Cited

U.S. PATENT DOCUMENTS

| | | | | |
|---|---|---|---|---|
| 9,432,804 | B2* | 8/2016 | Hanson | G06Q 20/405 |
| 9,846,906 | B1* | 12/2017 | Acharya | G06Q 40/00 |
| 9,900,397 | B1 | 2/2018 | Cope et al. | |
| 10,373,148 | B1* | 8/2019 | Dixon | G06Q 20/22 |
| 10,387,876 | B1* | 8/2019 | Buentello | G06Q 20/28 |
| 10,825,307 | B1* | 11/2020 | Bhuvad | G06Q 10/02 |
| 10,901,597 | B1* | 1/2021 | Nandanuru | G06F 3/04847 |
| 11,354,632 | B1* | 6/2022 | Hill | G06Q 20/3223 |
| 11,948,136 | B1* | 4/2024 | Thimmareddy | G06Q 20/3224 |
| 2003/0028458 | A1* | 2/2003 | Gaillard | G06Q 40/00 705/35 |
| 2012/0226524 | A1* | 9/2012 | Corbett | G06Q 10/0631 705/43 |
| 2013/0124411 | A1* | 5/2013 | Kobres | G06Q 40/02 235/379 |
| 2014/0019336 | A1 | 1/2014 | Browne et al. | |
| 2015/0001289 | A1* | 1/2015 | Smith | G07F 19/20 235/379 |
| 2015/0058192 | A1* | 2/2015 | Balram | G06Q 40/02 705/35 |
| 2015/0090782 | A1* | 4/2015 | Dent | G06Q 20/3223 235/379 |
| 2016/0019539 | A1* | 1/2016 | Hoyos | G06Q 20/327 705/75 |
| 2016/0379211 | A1* | 12/2016 | Hoyos | H04L 63/0861 705/75 |
| 2018/0165663 | A1* | 6/2018 | Naik | G06Q 20/3223 |
| 2018/0247275 | A1* | 8/2018 | Petrov | G06Q 20/405 |
| 2020/0082676 | A1* | 3/2020 | Carroll | G07F 19/206 |
| 2020/0118397 | A1* | 4/2020 | Yang | G07F 19/207 |
| 2020/0221255 | A1* | 7/2020 | Dadhaniya | G06Q 20/40145 |
| 2020/0334347 | A1* | 10/2020 | Hoyos | H04L 63/0861 |
| 2020/0356979 | A1* | 11/2020 | Dadhaniya | G06Q 20/327 |
| 2020/0410824 | A1* | 12/2020 | Bhuvad | G06V 40/172 |
| 2021/0019719 | A1* | 1/2021 | Kraft | G07F 19/2055 |
| 2021/0150497 | A1* | 5/2021 | Phillips | G06Q 20/3276 |
| 2021/0357897 | A1* | 11/2021 | Phillips | G06Q 20/326 |
| 2021/0365906 | A1* | 11/2021 | Gupta | G06F 1/1698 |
| 2021/0375103 | A1* | 12/2021 | Chauhan | G07F 19/211 |
| 2022/0172202 | A1* | 6/2022 | Wedmore | G07F 19/20 |
| 2023/0012424 | A1* | 1/2023 | Chauhan | G07F 19/206 |
| 2023/0101582 | A1* | 3/2023 | Long | G07F 9/001 705/64 |
| 2023/0351378 | A1* | 11/2023 | Yarabolu | H04W 12/33 |
| 2024/0095698 | A1* | 3/2024 | Thimmareddy | G06Q 20/386 |

OTHER PUBLICATIONS

Credit Union Journal: New Software Allows Withdrawals via Smartphone, Jun. 25, 2012, Dialog Archives, pp. 1-2. (Year: 2012).

Zhou et al.: Ultra Low-Power UWB-RFID for Precise Location-Aware Applications, 2012, IEEE Wireless Communications and Networking Conference Workshops (WCNCW), Paris, pp. 1-6. (Year: 2012).

* cited by examiner

QUEUE MANAGEMENT FOR PRE-STAGED TRANSACTIONS AT ULTRA-WIDE ENABLED ATMS

TECHNICAL FIELD OF DISCLOSURE

The present disclosure relates to processes and machines for information security access control and authentication including, in particular, systems, methods, and apparatus for the prevention of unauthorized access to resources of a system or information system, such as information security machines, ultra-wideband (UWB) enabled automated teller machines (ATMs) and ATM server(s), and/or the like that have improved capabilities, including the manner of securely identifying, verifying, geographically locating, location scoring, processing, routing, providing notifications, and/or generating haptic feedback reminders regarding, inter alia, pre-staged transactions, through the utilization of UWB networking and secure computing architectures and/or infrastructures, which are used in conjunction with UWB-enabled wireless portable electronic devices that have application execution, transaction processing, wireless communication, geolocation, and/or haptic feedback capabilities including, but not limited to, smart phones, smart watches, and/or other electronically communicable wearable devices, and for management of queues at UWB-enabled ATMs.

BACKGROUND

Banks are testing new technology that could not only reduce consumers' risk of fraud but also shorten waiting times. "Pre-staging," as it is called, eliminates the need to swipe a magnetic-strip card at an ATM.

For example, bank users can use their smartphone or a computer to start one or more transaction(s), such as withdrawals, deposits, and/or transfers, before going to an ATM. They might log onto a mobile banking app or provider website from their home, begin transaction processing thereon, and later complete the transaction(s) at an ATM. A smartphone using the banking app can generate a code, such as barcode or QR code, that appears on their phone's screen, which the user can scan at an ATM to take out cash. The process is reminiscent of smartphone-based two-factor authentication, which will not verify a user unless the individual has access to a linked mobile device, as well as a username and password.

ATMs with pre-staging capabilities have cut the length of ATM transactions from minutes to as few as seconds, which is beneficial from a time-saving perspective and also lowers the user's risk of exposure to outside environmental variables based upon expedited processing of one or more transactions. In addition to these benefits, pre-staging provides enhanced information computer security by reducing the threat of card fraud. This is because users do not swipe their cards during pre-staged cash withdrawals or other transactions, and therefore criminals are not able to use ATM skimming devices to steal account information. Pre-staged ATM transactions are also tokenized, so the data switching between the phone and ATM can be used only once, rendering it useless to cyber-criminals.

For various reasons, users are often unable to reap the benefits of pre-staged transactions and networked ATMs that are geographically dispersed, because they forget to timely perform the transactions, which are typically time-bounded and therefore expire before transaction execution. Moreover, even if a user remembers to go to an ATM to perform one or more pre-staged transactions, the user may select an ATM that is not ideal because it is currently busy with other users or it may become busy in the near future with other users before the user can physically arrive at the ATM, thereby resulting in an unnecessarily high queue wait time. In contrast, other preferred ATMs with little or no wait time may be available that are located in close proximity to where the user is or will be in the future. Furthermore, users may select an ATM that is not configured to work in conjunction with an ultra-wideband network let alone interoperate with a smart device that can provide haptic feedback in order to provide desired user notifications and obviate the foregoing problems.

SUMMARY

Aspects of this disclosure address one or more of the shortcomings in the industry by, inter alia, enabling timely and optimal user completion of pre-staged transactions at desirable ultra-wideband (UWB) enabled ATMs and physical locations through the use of improved infrastructures and UWB network technology and queue management at such ATMs and physical locations, which are interoperable with one or more of a user's UWB-enabled wireless portable electronic devices that can provide ATM information, transaction scheduling and user prioritization, transaction notifications, and/or haptic-feedback reminders based on one or more real-time and/or predicted geographical locations and proximities, ATM-specific queue wait times, preference scores, historical usage, ATM resources, and/or other relevant data or preferences.

Customers can receive estimated wait times at one or more ATM queues based on a proximity calculator, considering the queue length, ATM available resources (e.g., cash on hand available for withdrawals), customer priorities, etc. Queue wait time can comprise one or more components, such as the number of customers physically present at the ATM and the number of customers who have an active pre-staged transaction at the ATM at that given time. A score, such as a preference score, may be calculated based on the history of the customer using, for example, a number of transactions and frequency of transactions that at one or more particular ATM, as well as the travel time for the customer to reach various ATM locations. The customer may then be able to use the capability of location identification of an ATM based on the ultra-wideband enabled ATM, the queue wait time estimation, the preference score, and/or travel time, in order to assist the customer in selecting an optimal and/or preferred ATM of their choice to complete the one or more pre-stated transactions.

As used herein, UWB refers to radio-based communication technology for short-range use to provide fast and stable transmission of data. UWB technology provides real-time location detection functionality, real-time proximity analysis, and precise calculation of embedded sensor locations for a response device within the UWB range of an initiating device using "time of flight" (ToF) of transmission at various frequencies as all discussed below. UWB is able to transmit information across a wide bandwidth of >500 MHz. This allows for the transmission of a large amount of signal energy without interfering with conventional narrowband and carrier wave transmission in the same frequency band.

In light of the foregoing background, the following presents a simplified summary of the present disclosure in order to provide a basic understanding of various aspects of the disclosure. This summary is not limiting with respect to the exemplary aspects of the inventions described herein and is not an extensive overview of the disclosure. It is not intended to identify key or critical elements of or steps in the disclosure or to delineate the scope of the disclosure. Instead, as would be understood by a personal of ordinary skill in the art, the following summary merely presents some concepts of the disclosure in a simplified form as a prelude to the more detailed description provided below. Moreover, sufficient written descriptions of the inventions of this application are disclosed in the specification throughout this application along with exemplary, non-exhaustive, and non-limiting manners and processes of making and using the inventions, in such full, clear, concise, and exact terms in order to enable skilled artisans to make and use the inventions without undue experimentation and sets forth the best mode contemplated by the inventors for carrying out the inventions.

In accordance with one or more arrangements of the disclosures contained herein, solution(s) are provided to enable users to keep track of their pre-staged ATM transactions and get real-time or other notification(s) when they are in the proximity of an appropriate UWB-enabled ATM. This also allows the user to choose preferred ATMs based on their locations, queue wait times, ATM capabilities, and ATM resources. A user can pre-stage one or more ATM transactions. The ATMs may be connected to a central server and can share the pre-staged transaction details across multiple ATMs. At one or more servers or other information computer security machines, one or more recurring jobs may fetch some or all of the pre-staged transactions that are still active such as, for example, transactions within a set time limit. The ATMs can then be "aware" of the potential, active, pre-staged transactions. One or more ATMs may be paired with an UWB transmitter/receiver/transceiver that has a capability to detect nearby devices within a range, such as, for example, within 500 meters based on a time-of-flight or other suitable UWB network calculation. In a scenario where the user is physically in proximity of one or more appropriately enabled ATMs, one or more ATMs may transmit one or more UWB signals directly and/or indirectly to one or more of a user's UWB-enabled wireless portable electronic devices such as smart phones, smart devices, smart watches, IoT, or other devices. These communications may be made indirectly to one device, which is then relayed to another device, such as a wearable device, and/or directly made to the wearable device. One or more portable electronic devices can then notify the user using haptic feedback or via another alert or notification mechanism. The user can receive an estimated wait time at one or more ATM queues based on a proximity calculator, considering the queue length. Queue wait time can compromise one or more components, such as the number of users physically present at the ATM and the number of users who have an active pre-staged transaction at the ATM at that given time. A score, such as a preference score, may be calculated based on the history of the user using, for example, a number of transactions and frequency of transactions that at one or more particular ATM, as well as the travel time for the user to reach various ATM locations. The user may then be able to use the capability of location identification of an ATM based on the UWB-enabled ATM, the queue wait-time estimation, the preference score, and/or travel time, in order to assist the user in selecting an optimal and/or preferred ATM of their choice to complete the one or more pre-stated transactions. After authentication, a user can then perform their pre-staged transactions using a physical keypad, wirelessly with one or more of their portable electronic devices, and/or by voice commands at the selected ATM machine.

In some arrangements, an UWB automated pre-staged transaction system for use with at least one UWB-enabled wireless portable electronic device that generates at least one pre-staged transaction can be utilized in conjunction with one or more ATM servers and a plurality of UWB-enabled ATM machines. The ATM servers and ATM machines can each have processor(s) and communication interface(s) communicatively coupled thereto, and one or more memory devices or media for storing computer-executable instructions. These instructions can cause the ATM server(s) to receive, by the at least one server communication interface from the at least one wireless portable electronic device: a unique hardware identifier for each wireless portable electronic device; a unique user identifier corresponding to each unique hardware identifier such that the server will know each of the portable devices that are owned by the user; and one or more pre-staged transaction created by the user. The ATM server computer-executable instructions can further cause its processor to store in the server memory: an identification of the user, pre-staged transaction(s) for the user, and the unique hardware identifiers for the user's wireless portable electronic devices. The instructions can also cause the server's processor(s) to generate a private encryption key and a public encryption key to enable secure communications between ATM machines and the user's wireless portable electronic devices. The ATM server can also transmit through its communication interface to appropriate regional ATM machines: user identifications, hardware identifiers for the user's devices, public and private keys to be used with the user's devices, and the pre-staged transactions. The ATM machines can receive, through their communication interfaces, some or all of the information transmitted by the ATM server(s). The ATM machines can detect, through use of an UWB transceiver or other suitable UWB hardware, the user's wireless portable electronic devices using UWB networking and the user's hardware identifiers when the user is within wireless range (e.g., approximately 500-800 meters or less in distance) of the ATM machines. The ATM machine can establish secure communications with the user's devices based on the public and private encryption keys generated by the ATM server(s). A first haptic-feedback notification can be sent by the ATM machine to the user's device regarding one or more still-valid but uncompleted pre-staged transactions. The notification can trigger haptic feedback on the user's device to remind the user about the pre-staged transactions. The user can then execute the pre-staged transactions at the ATM machine if desired. Transaction status, such as whether completed or not, can be relayed from the ATM machine(s) to the ATM server(s).

Any type of haptic feedback can be used in conjunction with various arrangements of this disclosure. One example is vibrotactile haptics in which tiny motors create vibrations and other tactile effects in mobile phones or smart devices. Another is force control in which levers or other mechanical devices are used to exert force on a user's hands. Another example is ultrasonic mid-air haptics in which algorithms control ultrasound waves so that the combined pressure of the waves interacting produces a force that can be felt on the user's hands. A further example is microfluidics in which air or liquid is pushed into tiny chambers within a smart textile or other device. Another is surface haptics in which friction is modulated between a user's finger and a touchscreen to create tactile effects.

In some arrangements, the ATM server(s) can receive an UWB location for the user based on the user's device location and UWB network detection of one or more of the user's hardware identifiers. Proximities from the at least one UWB-enabled wireless portable electronic device to the ATM machines can be calculated along with queue wait times for the various ATM machines. A ranked or unranked list of recommended or preferred ATMs and locations can be shared with users for their consideration and potential ATM machine user selection.

In some arrangements, haptic feedback may be provided directly on a smart phone, smart watch, and/or other wearable or portable device. Alternatively, a trigger message can be relayed from one device to another such that the haptic feedback is indirectly triggered.

In some arrangements, an UWB ATM transaction pre-staging method for use with at least one UWB-enabled wireless portable electronic device can comprise various steps. A server can register a unique user identification and, for each at least one UWB-enabled wireless portable electronic device, also register a unique hardware identifier. A server can generate private and public encryption keys for each user and/or user identifier, which is preferably unique. A server can transmit to one or more UWB-enabled wireless portable electronic devices the private and public encryption keys, which enable secure communications between ATM machines and one or more user portable devices. A server can authenticate pre-staged transactions and can establish transaction sessions. The one or more UWB-enabled wireless portable electronic devices can initiate at least one pre-staged transaction and can transmit the same to ATM server(s), which process the transaction(s) and transmit them to one or more ATM machines for subsequent execution. The transactions may be transmitted to all machines, only machines in a selected region, only preferred machines as identified by the server(s), and/or based on any desired criteria. ATM machines can use UWB networking and related components and functionality in the machines in order to detect a user's UWB-enabled wireless portable electronic device(s) and/or corresponding unique hardware identifier(s), which were registered with the ATM server(s) and communicated to the ATM machine(s), when the device(s) come within range of the ATM machine(s). The user can be identified by the ATM machine(s) based on the unique user identification corresponding to the registered unique hardware identifier for the device(s). The ATM machine(s) can identify pre-staged transaction(s) for the user based on the foregoing information and provide direct and/or indirect haptic feedback to the user through one or more of the UWB-enabled wireless portable electronic device(s), which can then be used by the user to complete the pre-staged transaction(s) if desired.

In some arrangements, an UWB ATM transaction pre-staging method for use with at least one UWB-enabled wireless portable electronic device can comprise various steps. The at least one UWB-enabled wireless portable electronic device can schedule at least one pre-staged transaction. An ATM can retrieve a list of all pre-staged transactions for a user. An UWB transceiver in the ATM can transmit identification information relating to said list. The ATM can perform a proximity check to determine if any of the at least one UWB-enabled wireless portable electronic devices are in range of the ATM's UWB transceiver(s), transmitters, and/or receivers. The ATM can broadcast a message to the UWB-enabled wireless portable electronic device(s). Communications between the ATM and the portable electronic device(s) can be secured by a public encryption key and a private encryption key. Haptic feedback on the device(s) can be triggered, directly and/or indirectly, based on receipt of a notification message received from the ATM. A banking app may be opened manually and/or automatically on the portable device(s) and be used to establish a session with the ATM, which can manage the session. The location of the UWB-enabled wireless portable electronic device(s) can be determined by use of, inter alia, the UWB transceiver(s) in one or more ATMs and/or other UWB-enabled devices. The ATM may calculate a fixed and/or variable wait time and manage a queue at the ATM. Users may complete their pre-staged transactions at the ATM through use of the banking app.

In some arrangements, ATM server(s) can receive, by communication interface(s), an UWB location for UWB-enabled wireless portable electronic device(s) and can calculate: proximities from the portable electronic device(s) to ATM machines, queue wait times for the ATM machine(s), historical frequencies and numbers of visits for use of ATM machine(s), and an ordered preference list based on the queue wait times and proximity information. The ATM server(s) can communicate some or all of this information to ATM machine(s) and/or the user's portable device(s).

In some arrangements, UWB-enabled wireless portable electronic device(s) may be smart phones, smart watches, and/or other portable devices that directly and/or indirectly—such as Bluetooth pairing with another device—can provide haptic feedback to remind user's to complete pre-staged transaction(s).

In some arrangements, queue management functionality may be incorporated into one or more of the foregoing aspects in order to optimize recommendation, selection, and use of optimal UWB-enabled ATMs.

In some arrangements, a queue management UWB ATM transaction pre-staging method can be used with an ATM server, at least one UWB-enabled wireless portable electronic device, and a plurality of UWB-enabled ATMs. UWB-enabled wireless portable electronic devices can pre-stage transactions with the ATM server, which can transmit the pre-staged transactions to the plurality of ATMs. Queue wait times based on a number of scheduled transactions and a number of waiting customers can be calculated for each ATM, and the queue wait times can be provided to the ATM server. The ATM server may determine geographical distances between the at least one UWB-enabled wireless portable electronic device and the plurality of UWB-enabled ATMs. The ATM server may determine historical usage preferences for user and the plurality of UWB-enabled ATMs. The ATM server may generate at least one recommendation for which of the plurality of UWB-enabled ATMs to use based on the queue wait times, the geographical distances, and the historical usage preferences.

In some arrangements, ATM prioritizations and/or recommendations may be based on queue wait times at each ATM, geographical proximities of the at least one UWB-enabled wireless portable electronic device to the ATMs, currency resources available at the ATMs that correspond to requirements for the at least one pre-staged transaction, and historical usage of the ATMs.

These and other features, and characteristics of the present technology, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of 'a', 'an', and 'the' include plural referents unless the context clearly dictates otherwise.

DETAILED DESCRIPTION

In the following description of the various embodiments to accomplish the foregoing, reference is made to the accompanying drawings, which form a part hereof, and in which is shown by way of illustration, various embodiments in which the disclosure may be practiced. It is to be understood that other embodiments may be utilized and structural and functional modifications may be made.

Figure 1:
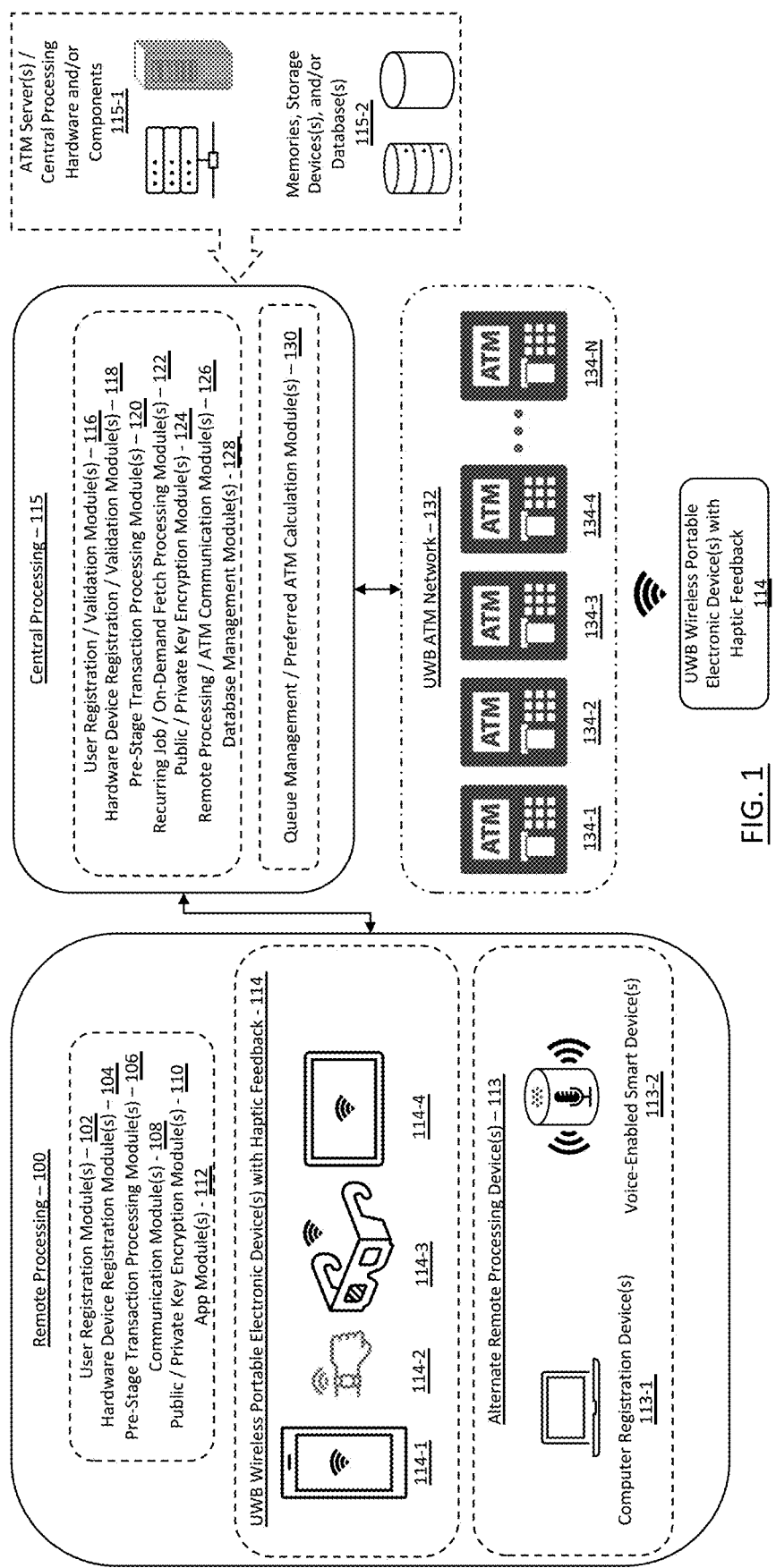
FIG. 1 illustrates a functional block diagram for remote processing, central processing, and distributed networking in which certain aspects of the present disclosure may be implemented.

FIG. 1 illustrates a functional block diagram for remote processing, central processing, and distributed networking in which certain aspects of the present disclosure may be implemented. Remote processing 100 functions may be performed on ultra-wideband (UWB) enabled wireless portable electronic device(s) 114 that can provide haptic feedback. Suitable UWB-enabled portable devices may include a smartphone 114-1, a smart watch 114-2, smart glasses 114-3, tablet devices 114-4, and/or any other UWB-enabled portable or wearable device. Alternatively, certain remote processing functions may also be handled directly and/or indirectly on alternative devices 113 such as computer registration machine(s) 113-1 and/or voice-enabled smart device(s) 113-2.

The remote processing 100 modules, routines, components, and/or functions may reside in non-volatile local memory in one or more sectors of memory, data stores, and/or data structures in the memory. Such exemplary remote-processing modules include user registration module(s) 102 that can be used to register a user and/or an account with a banking or other institution to enable UWB pre-staged transaction entering, processing, and haptic feedback reminding. Hardware device registration module(s) 104 can be used to identify unique hardware information and associate that information with a user and/or user account(s) so that the banking or other institution knows which devices are owned by which users. Sample hardware device information can include device make/model names with serial numbers, MAC address(es), Bluetooth address(es), IMEI numbers, ICCID numbers, SEID identifiers, and/or any other identifier that may be unique for the hardware device.

Remote processing 100 may also include pre-stage transaction processing module(s) 106 to enable user(s) to remotely pre-stage transactions such as withdrawals, transfers, deposits, wires, inquiries, reports, payments, and/or any other type of banking transaction. These types of pre-stage transactions can be communicated from remote devices 114 to central processing such as, for example, ATM server(s) by communication module(s) 108. Public and private encryption keys may be generated remotely and/or centrally and shared between the portable devices 114, central processing 115, and eventually with one or more ATM machine(s) 134-1, 134-2, 134-3, 134-4, . . . 134-N (generically referenced herein as 134) in an ATM network 132. Some and/or all of the remote processing functionality may be implemented in whole or in part through the use of an app residing on or otherwise accessible from the portable device 114. Alternatively, some or all of the remote processing functionality may also be implemented in whole or in part on the alternate remote processing devices 113 that may, for example, use an Internet interface to register device(s) 114, setup users, setup accounts, pre-stage transactions that can be communicated to the devices 114, etc.

Central processing 115 in one or more aspects of the disclosure can be implemented on ATM server(s), with central processing hardware, and/or central processing components 115-1. One or more centralized and/or distributed memories, storage device(s), and/or databases 115-2 in communication therewith may be used to store relevant modules, jobs, routines, data, and/or computer-executable instructions for implementing various server aspects of this disclosure.

Such central processing 115 functionality may include user registration/validation module(s) 116, which are used to enroll users in the UWB and haptic feedback functionality for pre-staged transactions. Hardware device registration/validation modules 118 may be used to correlate the user's UWB-enabled wireless portable electronic devices with the user and/or user account.

Pre-staged transaction processing module(s) 120 may communicate with devices 114 or 113 through communication module(s) 108, 126 and app 112 or other interface functionality in order to schedule and initiate transactions to be pre-staged. Initiation, authentication, validation, handling, and/or processing of pre-staged transactions may be performed as part of a recurring job, a batch process, and/or on-demand fetching in module(s) 112. Central processing 115 may also generate, share, and/or disseminate public and private encryption keys in module(s) 124 in order to facilitate secure communications between UWB-enabled wireless portable electronic devices(s) with haptic feedback 114 and one or more UWB-enabled ATMs 134-1, 134-2, 134-3, 134-4 . . . 134-N in an UWB ATM network 132. Database management module(s) 128 may be used to store and/or access any information or data used, generated, and/or disseminated by central processing 115. Central processing may also perform queue management and calculations regarding preferred ATMs in module 130 as described in more detailed below in reference to FIG. 6.

Figure 2A:
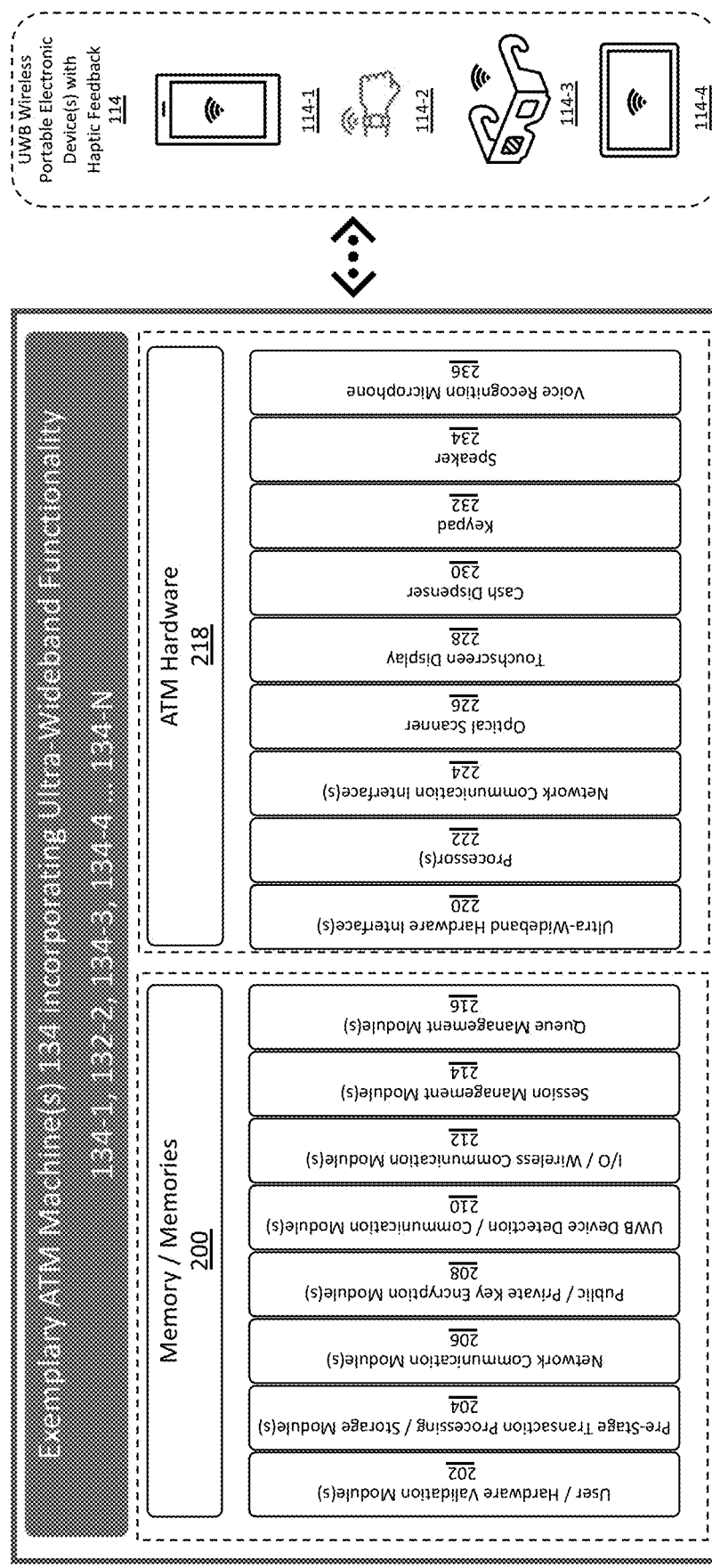
FIG. 2A illustrates hardware and software components for exemplary ATM(s) incorporating UWB functionality for use with UWB-enabled wireless user portable electronic devices that can provide haptic feedback in which certain aspects of the present disclosure may be implemented.

FIG. 2A illustrates hardware and software components for exemplary ATM(s) 134 incorporating UWB functionality for use with UWB-enabled wireless user portable electronic devices 114 that can provide haptic feedback in which certain aspects of the present disclosure may be implemented. Various ATM machine modules 202-216 for implementing functionality on the ATM, communicating with ATM server(s), handling pre-staged transactions, and interacting with users and user devices 114 may be stored in one or more sectors of integrated and/or accessible non-volatile memory, memories, data stores, databases or the like 200.

As an example, an ATM machine 134 will utilize user authentication and/or hardware validation module(s) 202 in order to authorize users to use the ATM and to proceed with pre-staged transaction(s) on validated and/or registered devices 114. Pre-staged transaction(s) received from the ATM server(s) 115-1 or central processing 115 may be stored in memory and/or processed in module 204. Network communication module(s) 206 may facilitate communications between ATM machine(s) 134 and ATM server(s)/central processing 115 via network communication interface(s) 224 in the ATM 134. User information, hardware information, encryption keys, session information, queue information, ATM information, etc. may be communicated via module(s) 206 and interface(s) 224.

Public and private encryption keys received from and/or distributed by central processing 115 can be stored in module 208 and used to enable establishment and securing of communications between ATM machine(s) 134 and UWB-enabled devices 114.

One or more modules 210 may be used to provide detection, location determination, and/or facilitate communication with UWB-enabled devices 114 via UWB hardware interfaces in the ATM machine 134. Such detection of UWB devices 114 may occur if and/or when the device 114 comes within UWB range of ATM machine 134 which, based on current UWB implementations, enable detection and communication within distances of approximately 500-800 meters or less. However, any UWB range is considered to be within the spirit and scope of the present invention.

Input/output (I/O) and/or wireless communication module(s) 212 in memory 200 may be used to accept ATM inputs via optical scanner 226, touchscreen display 228, keypad 232, and/or voice recognition microphone 236. Messages may be communicated to users via display 228 or speaker 234 and/or wirelessly to device 114. ATM 134 may also include session management 214 and/or queue management 216 modules to perform the functionality described infra locally and/or to communicate with central processing 115 for remote functionality performance at ATM server(s) 115-1 or the like.

In particular, notifications of pre-staged transaction(s) can be communicated via UWB from UWB-enabled ATM 134 to a UWB-enabled device 114 in order to trigger haptic-feedback reminders to perform the transactions when the device 114 is within range of the ATM 134.

Figure 2B:
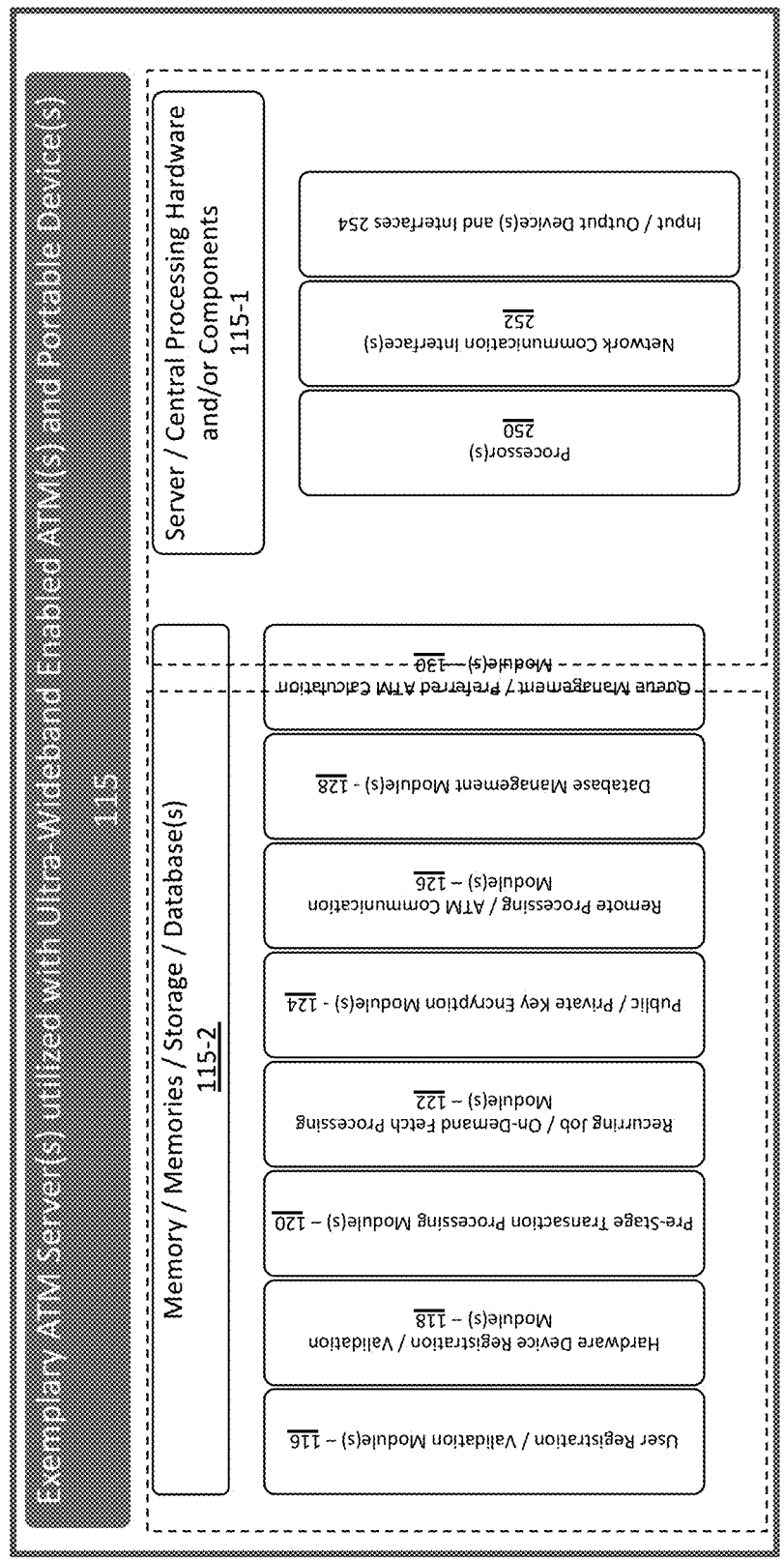
FIG. 2B illustrates hardware and software components for exemplary ATM server(s) utilized with UWB-enabled ATM(s) and UWB-enabled wireless user portable electronic devices that can provide haptic feedback in which certain aspects of the present disclosure may be implemented.

Relatedly, FIG. 2B illustrates hardware and software components for exemplary central processing facilities 115 such as ATM server(s) 115-1 utilized with UWB-enabled ATM(s) 134 and UWB-enabled wireless user portable electronic devices 114 that can provide haptic feedback in which certain aspects of the present disclosure may be implemented.

The central processing functionality 115 as implemented in ATM server(s) 115-1 and memories, storage device(s), and/or databases 115-2 as referenced in FIG. 2B have been described above in the discussion of FIG. 1 with respect to user registration/validation module(s) 116, hardware device registration/validation module(s) 118, pre-stage transaction processing module(s) 120, recurring job/on-demand fetch processing module(s) 122, public/private key encryption module(s) 124, remote processing/ATM communication module(s) 126, database management module(s) 128, and queue management/preferred ATM calculation and/or recommendation module(s).

The foregoing central processing functionality may be implemented using one or more local and/or distributed processor(s) 250, network communication interface(s) 252, and I/O devices and interfaces 254, and/or any other commercially available server hardware.

Figure 3:
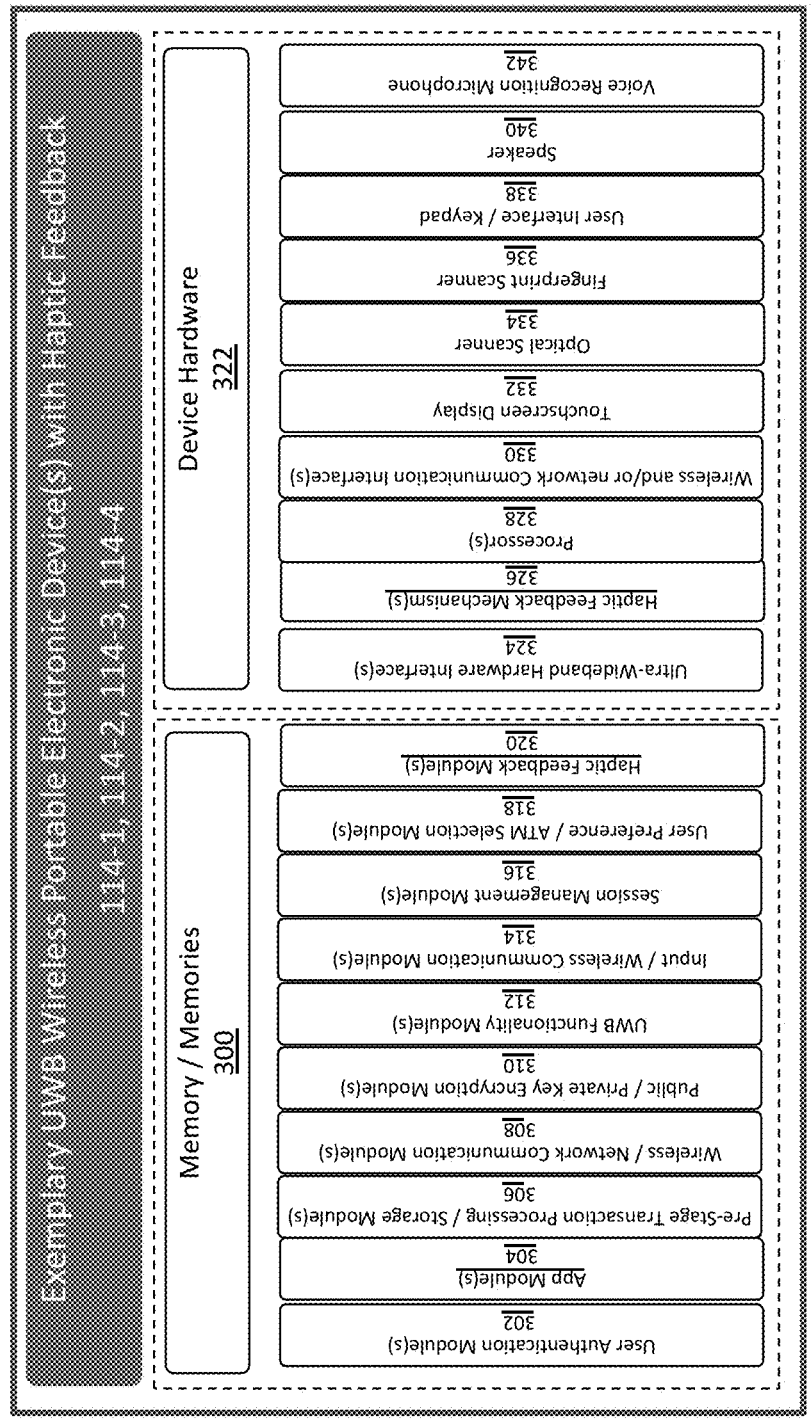
FIG. 3 illustrates hardware and software components for exemplary UWB-enabled wireless user portable electronic devices that can provide haptic feedback in which certain aspects of the present disclosure may be implemented.

FIG. 3 illustrates hardware and software components for exemplary UWB-enabled wireless user portable electronic devices 114 that can provide haptic feedback in which certain aspects of the present disclosure may be implemented. As noted above, UWB-enabled portable devices may include one or more of a smart phone 114-1, a smart watch 114-2, smart glasses 114-3, tablet devices 114-4, and/or any other UWB-enabled portable or wearable device.

In addition to the remote processing 100 functionality and/or module(s) 102-114 discussed with respect to FIG. 1, a UWB-enabled device 114 may include local non-volatile memory or memories 300 and hardware relevant to the particular type of device 114-1, 114-2, 114-3, 114-4, or the like.

User authentication module(s) 302 can be used by the device 114 in communication with the ATM 134 in order to authenticate the user in order to establish a session, recognize a device 114 corresponding to a user who has valid pre-schedule transaction(s) pending, and trigger a haptic feedback on the device 114. App module(s) 304, executed on processor(s) 328, can be used to facilitate session handling and/or execution of pre-staged and/or other transactions as well as to provide haptic feedback via haptic feedback module(s) 320 and haptic feedback mechanism(s) 326. Similarly, processor(s) 328 may execute instructions to perform the functionality of any of the module(s) stored in memory 300.

Pre-stage transaction processing/storage module(s) 306 on device 114 can be used to set up a transaction, store a previously set up transaction, and/or locally handle a transaction at the ATM 134. Wireless/network communication module(s) 308 can provide non-UWB wireless local communication between the device 134 and the ATM 134 or remote communication with central processing 115 such as ATM server(s) 115-1 via network communication interface(s) 330. Such non-UWB wireless communication may be via Bluetooth, Wi-Fi, NFC, or the like. UWB functionality module(s) 312 may also provide wireless communication between the device 134 and the ATM 134 or remote communication with central processing 115 such as ATM server(s) 115-1 via UWB hardware interface(s) 324. Alternatively, a combination of UWB and non-UWB functionality may be used to provide the functionality described herein.

Local public/private key encryption module(s) 310 may store key(s) received from ATM server(s) 115-1 and/or generate keys that are communicated to ATM server(s) 115-1 and thereafter distributed to ATMs 134. Either way, the public and private encryption keys stored in module(s) 310 are used to establish and facilitate secure communications between the UWB-enabled ATM 134 and the UWB-enabled device 114 via interfaces 324 and/or 330.

Session management module(s) 316 may enable the local device 114 to manage ATM sessions, may facilitate management by ATM 134, and/or may facilitate management by central processing 115. User preference/ATM selection module(s) 318 enable users to enter criteria regarding desired ATMs in the ATM network 132, view information regarding ATMs in the network, and/or to make ATM selections.

Input to device 114 and/or output displays to provide information to the user may be accomplished through a touchscreen or non-touchscreen display 332, an optical scanner 334 such as for facial recognition or barcode or QR code scanning, a fingerprint scanner 336, and/or user interface/keypad 338. A speaker 340 may be included in device 114 to provide audible information and/or feedback to the user. If desired, the haptic feedback conveyed herein may provided audibly. A voice-recognition microphone 342 may also be included in 114 to enable voice commands or dictation in order to obviate, in whole or in part, manual key entries or manual interactions with device 114.

Figure 4:
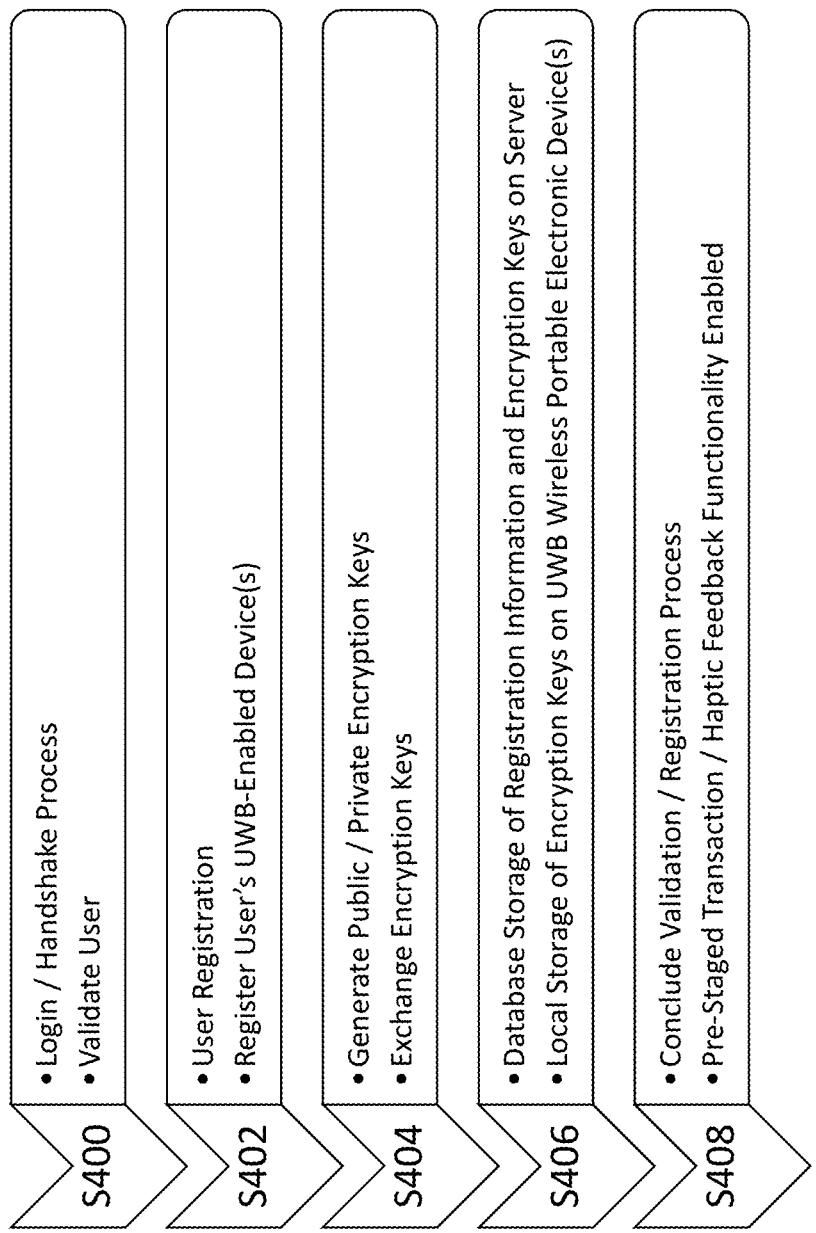
FIG. 4 is an illustrative flowchart of a sample method performed in accordance with one or more registration and/or validation implementations for users, setup of user account(s), and association of UWB-enabled wireless user portable electronic device(s) and corresponding hardware identifier(s) with the foregoing.

FIG. 4 is an illustrative flowchart of a method performed in accordance with one or more registration and/or validation implementations for users, setup of user account(s), and association of UWB-enabled wireless user portable electronic device(s) and corresponding hardware identifier(s) with the foregoing.

In step 400, a user may login and a handshake process may be implemented and the user may be validated. This may occur between remote processing 100 and central processing 115. In step 402, the user and the user's devices may be registered and the same may be stored in central processing 115 such as memory devices 115-2. This enables the ATM server(s) 115-1 and ultimately the ATM machine(s) 134 to recognize which devices 114 correspond to which users and/or user accounts.

In step 404, public and private encryption keys may be generated. The keys are exchanged between remote processing 100 and central processing 115.

In step 406, the keys are stored respectively and are communicated to one or more ATMs 134 in the ATM network 132. The keys are subsequently used to secure communications between device 114 and ATM 134.

In step 408, the validation/registration process for the user, the user's account, and the user's device(s) is concluded. Pre-stage transaction entering and processing as well as haptic feedback functionality on the device(s) 114 is enabled.

Figure 5:
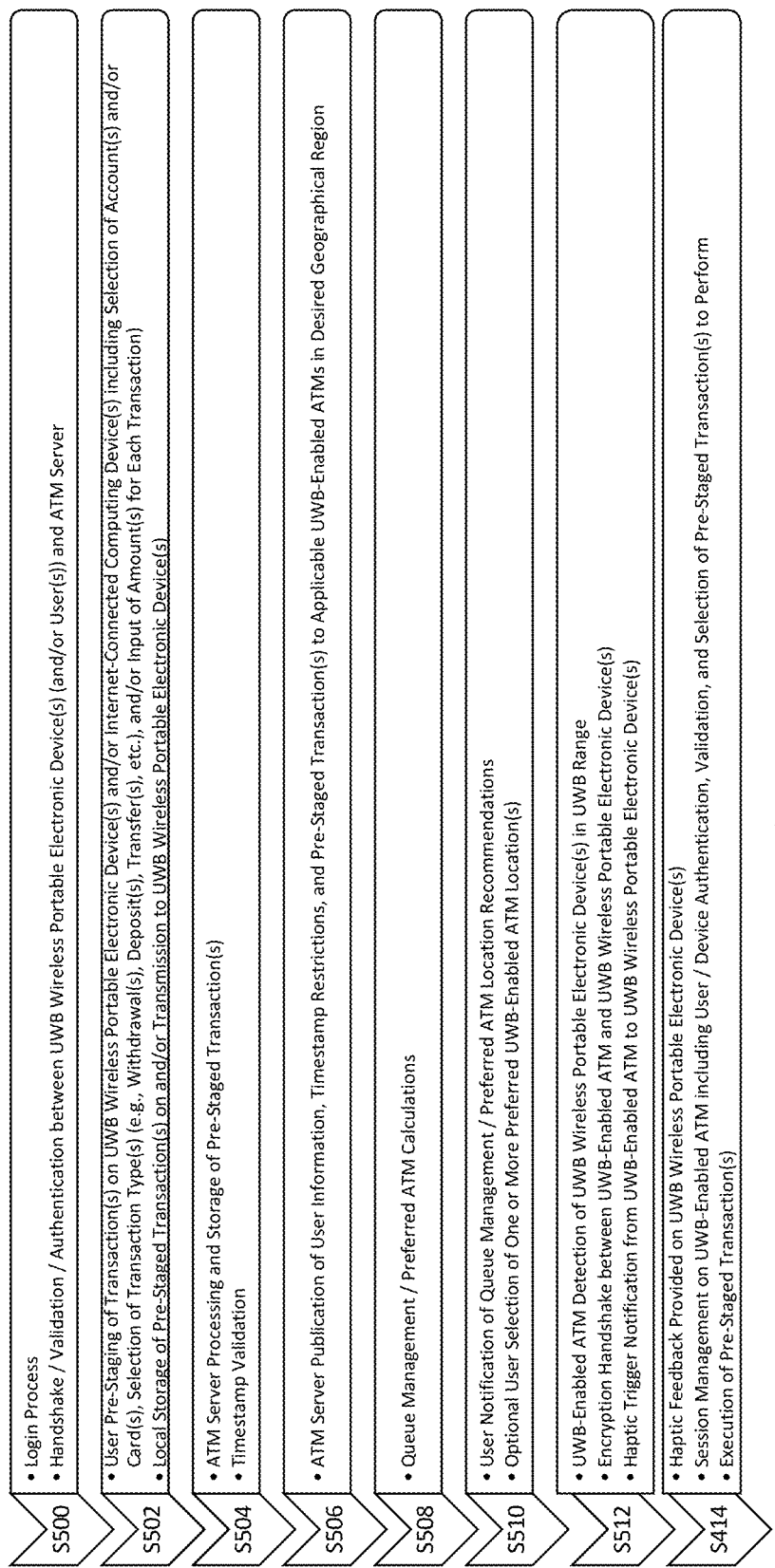
FIG. 5 is an illustrative flowchart of a method performed in accordance with one or more implementations for remote pre-staging, central processing, and local handling of pre-staged transactions using UWB-enabled machines and devices that are capable of providing haptic feedback.

FIG. 5 is an illustrative flowchart of a method performed in accordance with one or more implementations for remote pre-staging, central processing, and local handling of pre-staged transactions using UWB-enabled ATM machines 134 and devices 114 that are capable of providing haptic feedback.

In step 500, a login process is initiated and handshaking, validating, and authenticating is commenced and implemented between UWB-enabled wireless portable electronic device(s) 114 (and/or the users of such devices and/or their corresponding accounts) and central processing 115 such as ATM server(s) 115-1.

In step 502, user(s) pre-stage their transaction(s) on UWB-enabled wireless portable electronic device(s) 114 and/or through alternate Internet-connected computing devices 113-1 or 113-2 via web page(s) or dedicated executable applications. Transaction pre-staging in this step allows users to select one or more account(s) and/or card(s) corelated to accounts for account activity. Users may pre-stage one or more withdrawal(s), deposit(s), transfer(s), wire(s), and/or any other ATM transaction or the like including the amount(s) of any such pre-staged transaction(s). Pre-staged transaction(s) may then be locally stored 306 in non-volatile memory 300 on the UWB-enabled device(s) 114. Or they may be transmitted wirelessly from central processing 115 or ATM server(s) 115-1 to device(s) 114 and then stored 306 in device memory 300.

In step 504, central processing 115 or ATM server(s) 115-1 process and store pre-staged transaction(s). An entry timestamp may be applied to the transaction(s) and an expiration timestamp may be assigned as well. One or both of these timestamps may be used to set time period and/or duration of time during which the pre-staged transaction(s) will be valid or will remain valid.

In step 506, central processing 115 or ATM server(s) 115-1 may publish, to one or more applicable ATM machines 134 in an applicable geographical region, user information, user account identifier(s), timestamp transaction information or restrictions, the pre-staged transaction(s) or information that would enable ATMs 134 to retrieve the pre-staged transaction(s) from central processing 115 or ATM server(s) 115-1 on demand in real time.

In step 508, processing regarding management of queues and queue wait times, management of resources at ATMs 134, and calculations of preferred ATMs based on wait times, proximity between the user and the ATMs, user historical usage of ATMs, user preferences, and/or user selections can be performed.

In step 510, user devices(s) 114 can be provided notifications regarding queue wait times indirectly from central processing 115 or ATM server(s) 115-1, or directly from local ATMs 134 in the ATM network 132. ATM location recommendations or preferences can be provided to the users as well. Based on the information and notifications provided to the users, they can make selection(s) of one or more UWB-enabled ATMs 134 at which they would like to complete the pre-staged transactions.

In step 512, UWB-enabled ATMs 134 in the ATM network 132 constantly monitor or scan devices in the range of the ultra-wideband network to detect whether device(s) 114 are in range of one of the applicable ATMs 134. If a UWB-enabled ATM 134 detects, within its UWB range, one or more UWB-enabled device(s) 114, the ATM 134 can poll or obtain hardware identifier information regarding device 114 and determine whether the user and/or user device 114 has any time-valid pre-staged transactions scheduled for the ATM 134 or that are available for completion at the ATM 134. Initial communication(s) between UWB-enabled ATM(s) 134 and UWB-enabled device(s) 114 can be performed securely or in an unsecure fashion as desired.

If any such pre-staged transactions are available or scheduled for device(s) 114 at the ATM 134, an encryption handshake using the private and public keys can be performed to secure communications between the device(s) and machine(s). The ATM can then wirelessly send a notification to trigger directly a haptic-feedback reminder on a user's UWB-enabled device 114 or indirectly on a non-UWB-enabled wearable device or other device wirelessly coupled thereto. This would encompass any device coupled via Bluetooth, Wi-Fi, NFC, etc. to device 114. It could also include ear pieces or the like in which audible triggers are provided or that vibrate when triggered.

Upon receipt of the notification, UWB-enabled device 114 or non-UWB-enabled wearable device wirelessly coupled thereto can provide haptic feedback in step 414 to the user in step 512 to notify or remind users about their pre-staged transaction. A session can then be established between the ATM 134 and device 114 in this step including user/device authentication, validation, and selection of one or more of the pre-staged transactions to perform, after which the pre-staged transactions are executed.

Figure 6:
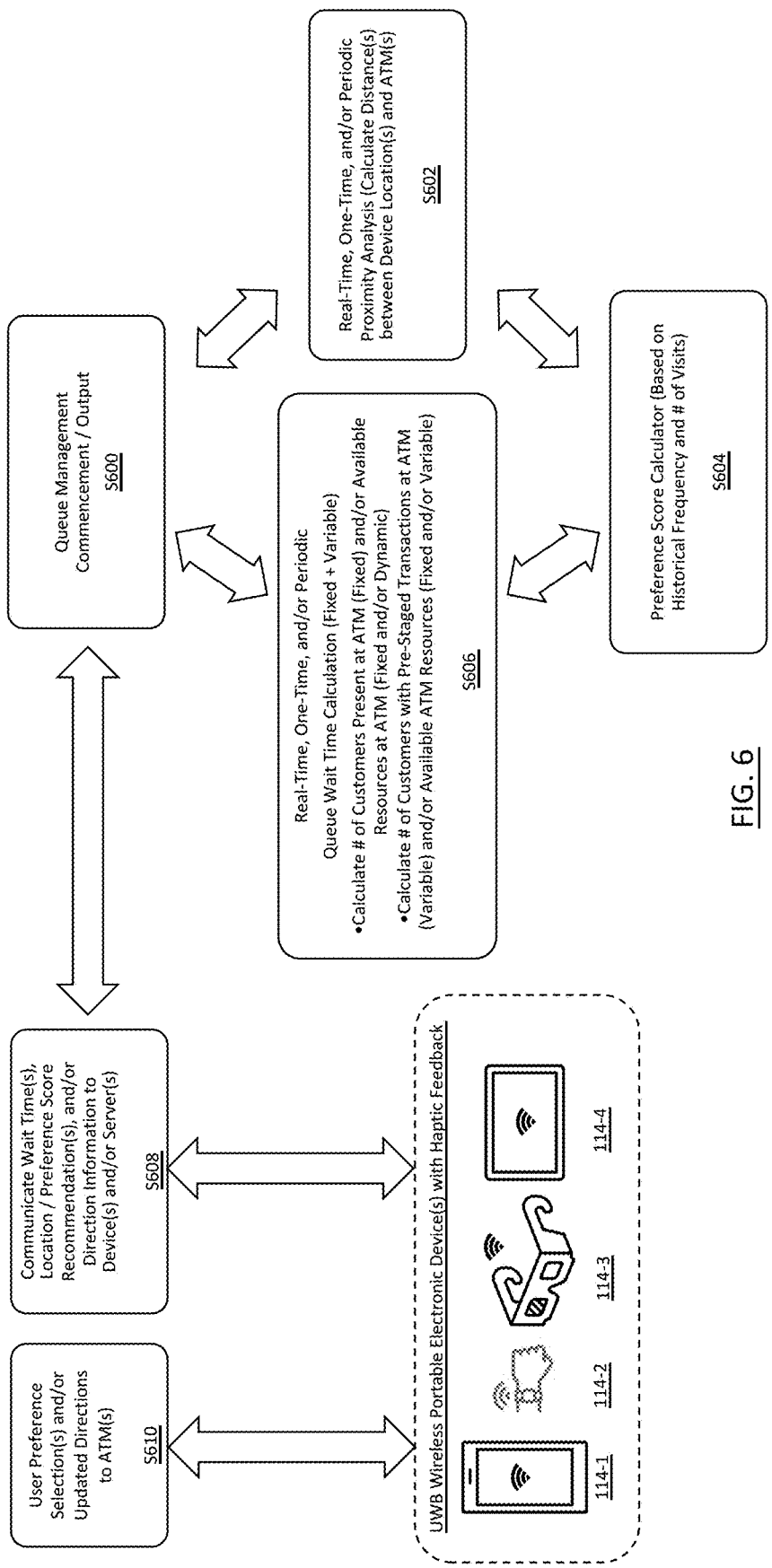
FIG. 6 is an illustrative flow chart and functional block diagram for queue management, proximity analysis, preference score determinations, machine/device communications regarding recommendations, options, and user selections in which certain aspects of the present disclosure may be implemented.

FIG. 6 is an illustrative flow chart and functional block diagram for queue management, proximity analysis, preference score determinations, machine/device communications regarding recommendations, options, and user selections in which certain aspects of the present disclosure may be implemented.

In step 600, central processing 115 or ATM server(s) 115-1 can initiate management functions and processes relating to managing queues at ATMs 134 in ATM network 132, and can provide notifications or communicate the results of such functions/processes to UWB-enabled ATMs 134 and/or UWB-enabled devices 114.

In step 602, one or more proximities between device(s) 114 and various ATMs within ATM network 132 can be determined by calculating the relative distances between device(s) 114 and ATMs 134. These determinations are preferably performed in real-time, but could also be performed one time, periodically, and/or on-demand. UWB technology enables precise and fast location determinations, which facilitates the real-time performance of the calculations.

In step 604, a preference score for one or more of the ATMs 134 in the network 132 can be calculated based on any desired criteria. These criteria could be based on a user's historical usage or frequency of visits to the particular ATM, where the ATM is located with respect to the user's planned path of travel, where the ATM is located based on the user's historical travel pattern for a particular time of day.

In step 606, individual queue wait times for various ATMs 134 in the ATM network 132 can be calculated based on fixed and/or variable factors, either at the current time or projected for the future. This may include calculating a number of customers present at ATMs 134 (fixed), the number of customers in line at the ATMs 134 (fixed and/or variable), and/or available resources at the ATM 134 (fixed and/or dynamic). Resources could include the number of bills of various currency denominations that are available for withdrawal or could be based on available ATM functionality. The number of users with pre-staged transactions at the particular ATM 134 (variable) could be calculated as well as the available ATM resources (fixed and/or variable) can be determined or projected.

In step 600, central processing 115 or ATM server(s) 115-1 can then provide notifications or output the results of such functions/processes to UWB-enabled ATMs 134 and/or UWB-enabled devices 114.

In step 608, wait time(s), location/preference score recommendation(s), and/or direction information to the ATMs can be communicated to device(s) 114 for user consideration.

In step 610, users are able to set preferences regarding the ATM(s) at which they would like to execute their pre-staged transaction(s). Updated information from central processing 115 or ATM server(s) 115-1 can be provided as desired or as updated calculations are available. Updated user directions to the ATMs 134 based on user selections as well.

Figure 7:
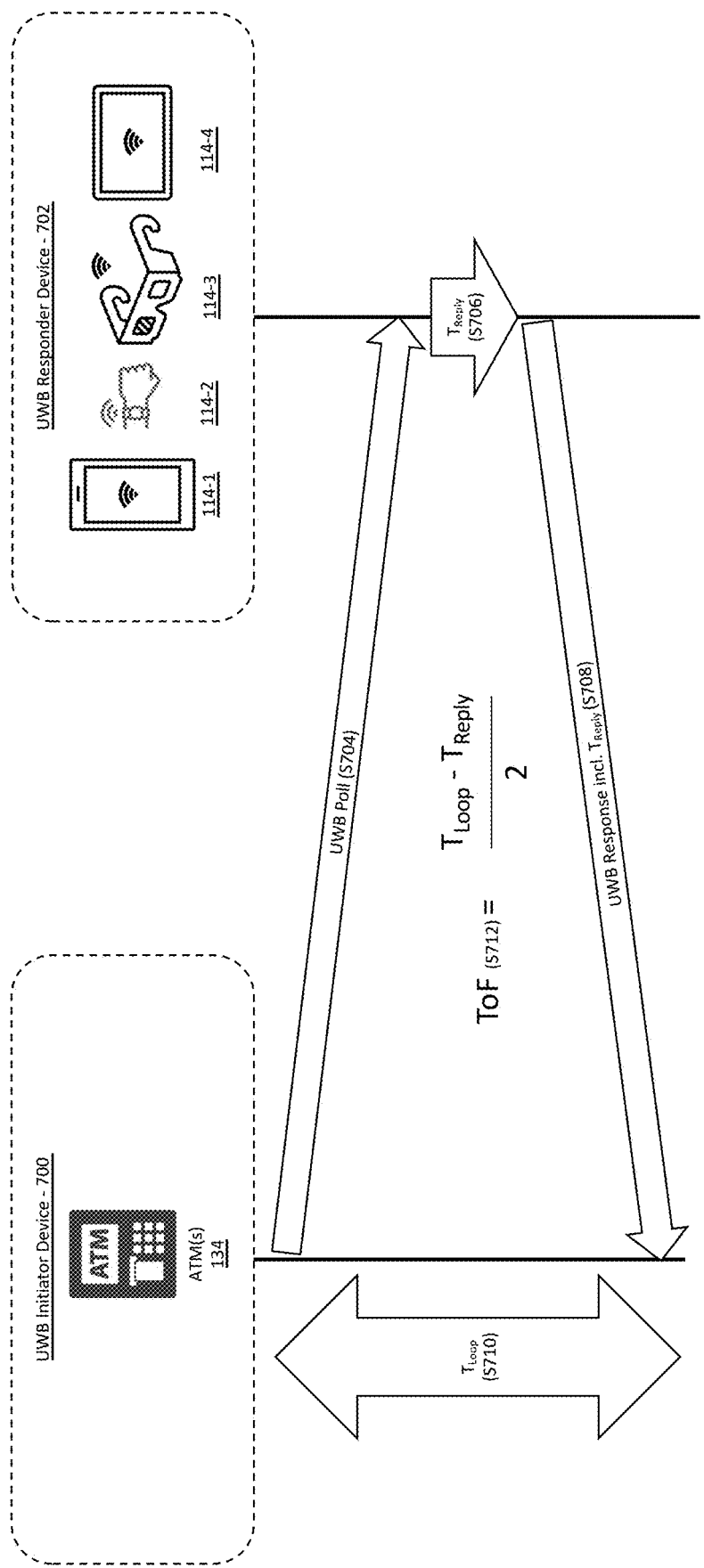
FIG. 7 is a functional block diagram depicting an exemplary "time of flight" (ToF) method of utilizing UWB technology to locate UWB-enabled devices in relation to UWB-enabled ATM machine(s) in which certain aspects of the present disclosure may be implemented.

FIG. 7 is a functional block diagram depicting an exemplary "time of flight" (ToF) method of utilizing UWB technology to locate UWB-enabled devices in relation to UWB-enabled ATM machine(s) in which certain aspects of the present disclosure may be implemented.

As illustrated in FIG. 7, a UWB initiator device 700 (e.g., a UWB-enabled ATM 134) can send a poll message in step 704 to a UWB responder device 702. The amount of time for the device 114 to reply to the poll message can be determined in step 706. A UWB response can then be returned in step 708 to the UWB initiator device 700 and the time for the loop can be determined in step 710 such that the time of flight (ToF) can be calculated in step 712 based on subtracting the reply time from the loop time, and then dividing the result by 2. This can be used to determine whether a UWB responder device 702 is within range of the UWB initiator device 700 and/or whether the UWB responder device 702 is within a pre-determined "desired" range of the UWB initiator device 700.

Figure 8:
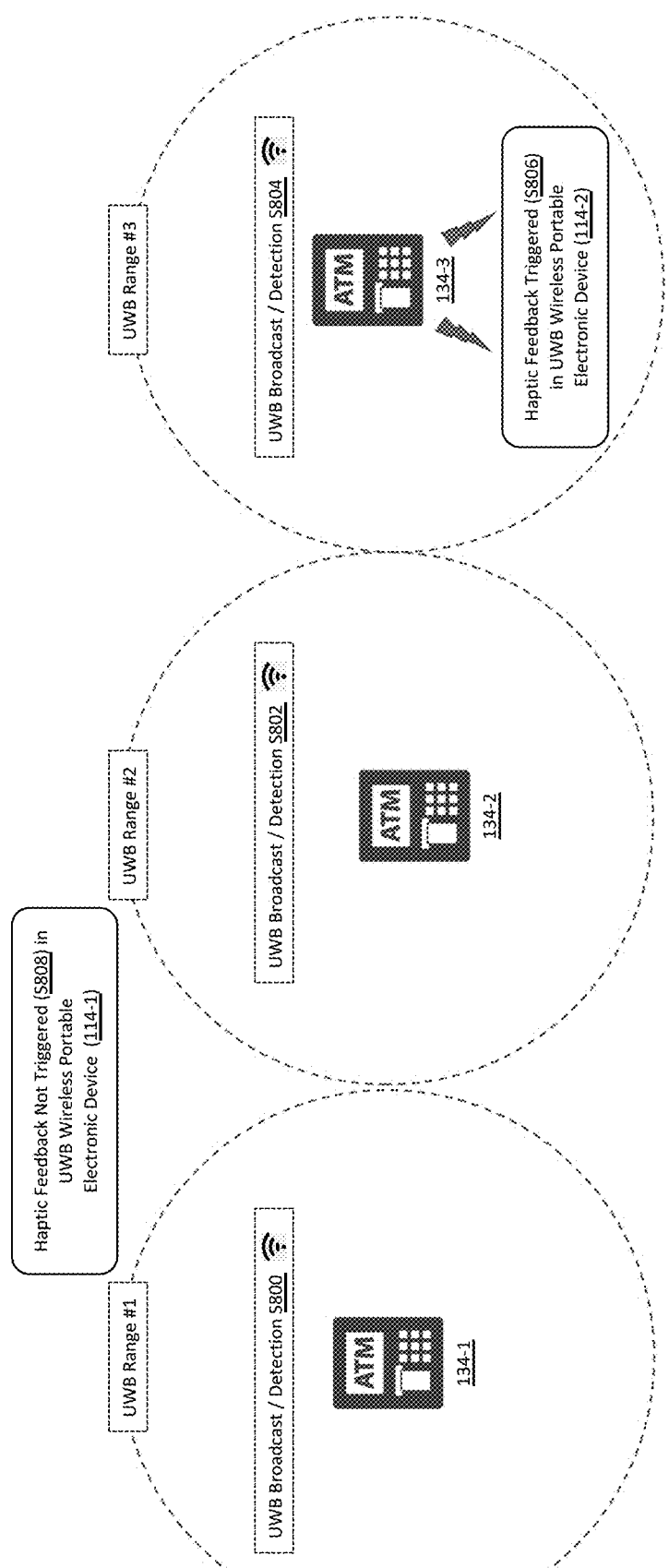
FIG. 8 is a geographical representation of using utilizing UWB technology in suitably enabled ATM machine(s) to detect when UWB-enabled devices are in range and to trigger haptic-feedback notifications to provide reminders of pre-staged transaction(s) in which certain aspects of the present disclosure may be implemented.

FIG. 8 is a geographical representation of using utilizing UWB technology in suitably enabled ATM machine(s) 134 in an ATM network 132 to detect when UWB-enabled devices 114 are in range and to trigger haptic feedback notifications to provide reminders of pre-staged transaction(s) in which certain aspects of the present disclosure may be implemented.

This can be accomplished in real-time, periodic, and/or on demand methods and calculations or determinations. For example, in steps 800 and 802, ATM machines 134-1 and 134-2 can respectively broadcast UWB messages to any UWB-enabled devices 114 in ranges #1 and #2, and can detect the presence of any such devices 114. In the examples of steps 800 and 802, no device(s) 114 were detected and therefore no further actions are taken at that time. Conversely, in step 804, ATM 134-3 detects the presence of a UWB-enabled device 114 and can then send notification(s) to trigger haptic feedback, which can are then provided on device 114.

Figure 9:
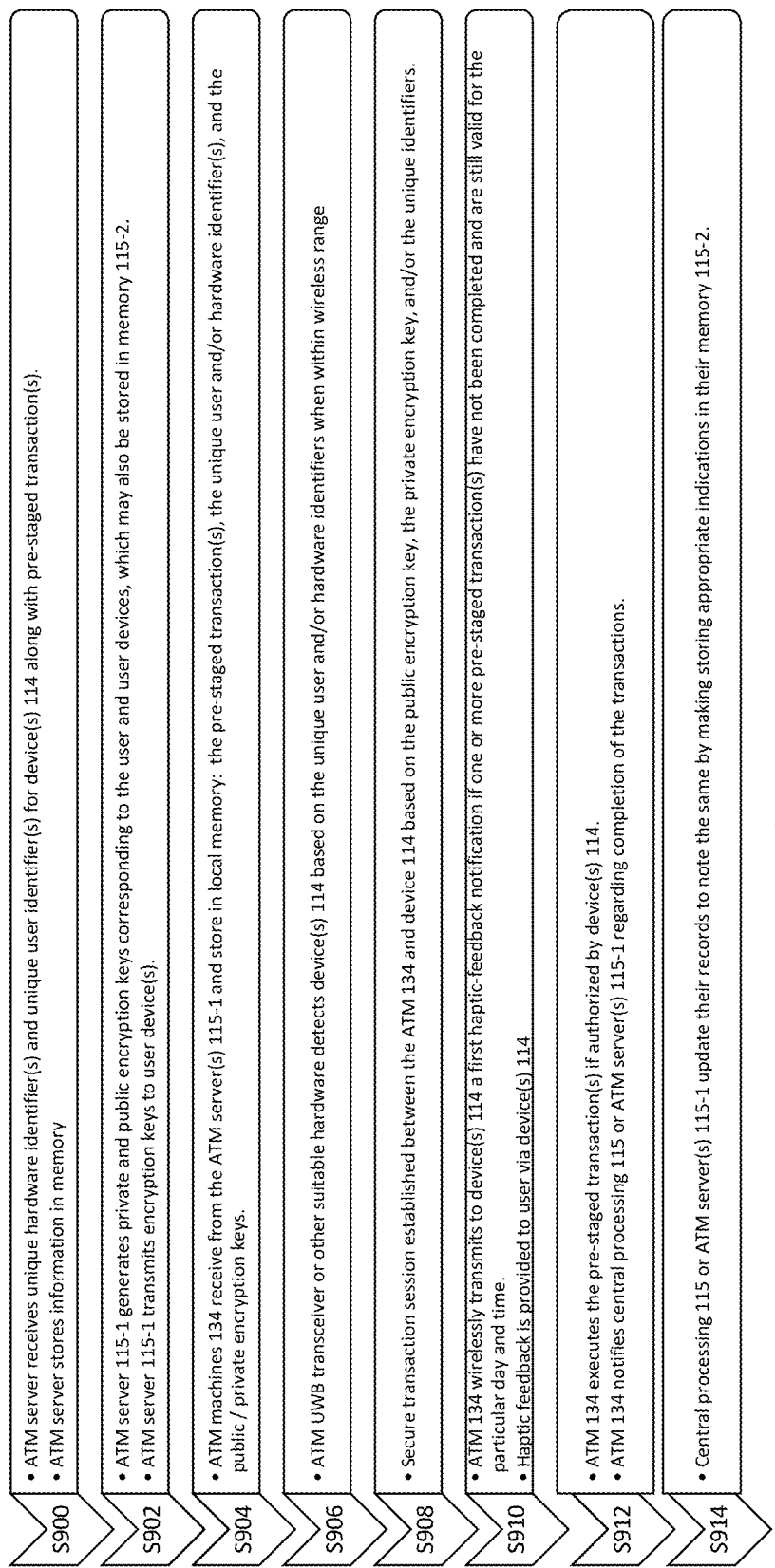
FIG. 9 shows sample method steps through which execution of one or more of the depicted steps can be used to implement certain aspects of the present disclosure in UWB automated pre-staged transaction system(s), UWB-enabled ATMs, or on UWB-enabled devices.

FIG. 9 shows sample methods steps in which various aspects of the present disclosure may be implemented in UWB automated pre-staged transaction system(s).

In step 900, an ATM sever 115-1 can receive unique hardware identifier(s) and unique user identifier(s) for device(s) 114 along with pre-staged transaction(s), and store some or all of the information in memory 115-2.

In step 902, ATM server 115-1 can generate private and public encryption keys corresponding to the user and user devices, which may also be stored in memory 115-2, and can be transmitted to user device(s) 114.

In step 904, one or more ATM machines 134 can receive from the ATM server(s) 115-1 and store in local memory: the pre-staged transaction(s), the unique user and/or hardware identifier(s), and the public/private encryption keys.

In step 906, an ATM UWB transceiver or other suitable hardware can detect device(s) 114, based on the unique user and/or hardware identifiers, when within wireless range (e.g., range 3 of FIG. 9).

In step 908, a secure transaction session can be established between the ATM 134 and device 114 based on the public encryption key, the private encryption key, and/or the unique identifiers.

In step 910, ATM 134 can wirelessly transmit to device(s) 114 a first haptic-feedback notification if one or more pre-staged transaction(s) have not been completed and are still valid for the particular day and time, and corresponding haptic feedback can be provided on the device(s) in response thereto.

In step 912, ATM 134 can execute the pre-staged transaction(s) if authorized by device(s) 114, and ATM 134 can notify central processing 115 or ATM server(s) 115-1 regarding completion of the transactions.

In step 914, central processing 115 or ATM server(s) 115-1 can update their records to note the same by making storing appropriate indications in their memory 115-2.

Figure 10:
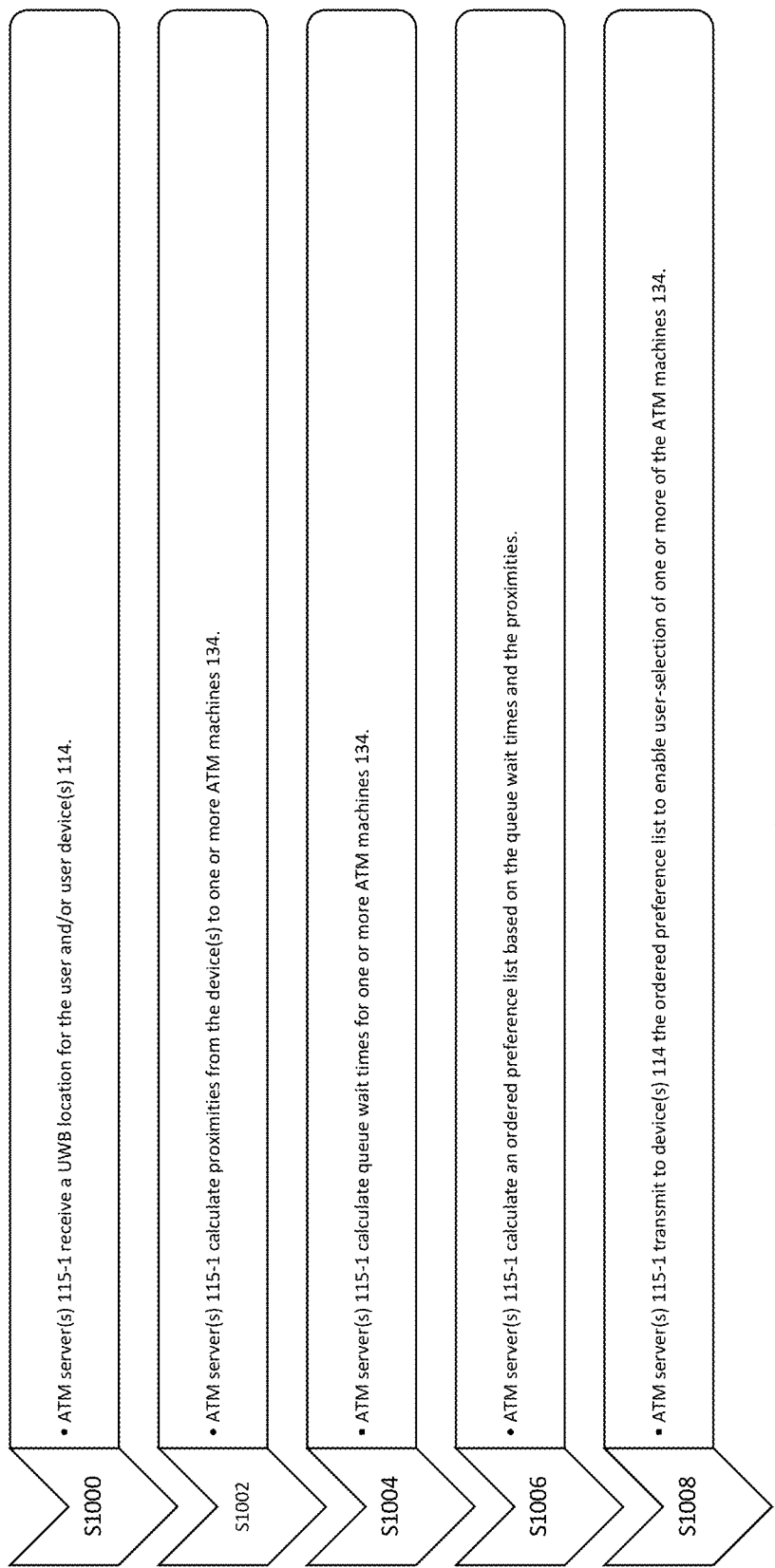
FIG. 10 shows additional exemplary method steps through which execution of one or more of the depicted steps can be used to implement certain aspects of the present disclosure in UWB automated pre-staged transaction system(s), UWB-enabled ATMs, or on UWB-enabled devices.

FIG. 10 shows additional exemplary method steps through execution of one or more of the depicted steps can be used to implement certain aspects of the present disclosure in UWB automated pre-staged transaction system(s), UWB-enabled ATMs, or on UWB-enabled devices.

In step 1000, central processing 115 or ATM server(s) 115-1 can receive a UWB location for the user and/or user device(s) 114.

In step 1002, central processing 115 or ATM server(s) 115-1 can calculate proximities from the device(s) to one or more ATM machines 134.

In step 1004, central processing 115 or ATM server(s) 115-1 can calculate queue wait times for one or more ATM machines 134.

In step 1006, central processing 115 or ATM server(s) 115-1 can calculate an ordered preference list based on the queue wait times and the proximities.

In step 1008, central processing 115 or ATM server(s) 115-1 can transmit to device(s) 114 the ordered preference list to enable user-selection of one or more of the ATM machines 134.

Figure 11:
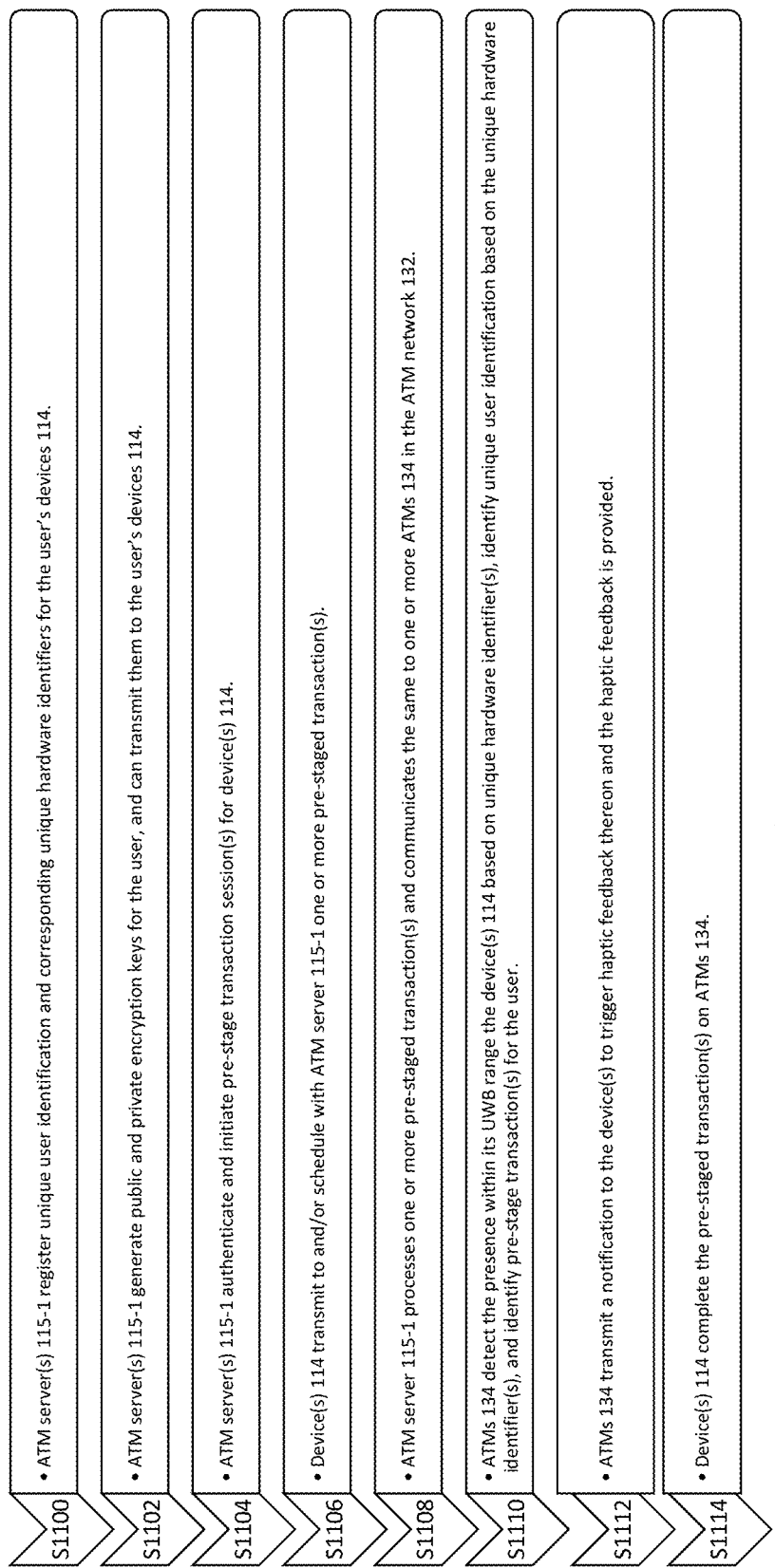
FIG. 11 shows sample steps to implement certain aspects of the present disclosure in UWB ATM transaction pre-staging method(s) for use with one or more UWB-enabled devices.

FIG. 11 shows sample steps to implement certain aspects of the present disclosure in UWB ATM transaction pre-staging method(s) for use with one or more UWB-enabled devices.

In step 1100, central processing 115 or ATM server(s) 115-1 can register unique user identification and corresponding unique hardware identifiers for the user's devices 114.

In step 1102, central processing 115 or ATM server(s) 115-1 can generate public and private encryption keys for the user, and can transmit them to the user's devices 114.

In step 1104, central processing 115 or ATM server(s) 115-1 can authenticate and initiate pre-stage transaction session(s) for device(s) 114.

In step 1106, device(s) 114 can transmit to and/or schedule with ATM server 115-1 one or more pre-staged transaction(s).

In step 1108, ATM server 115-1 processes one or more pre-staged transaction(s) and communicates the same to one or more ATMs 134 in the ATM network 132.

In step 1110, ATMs 134 detect the presence within its UWB range the device(s) 114 based on unique hardware identifier(s), identify unique user identification based on the unique hardware identifier(s), and identify pre-stage transaction(s) for the user.

In step 1112, ATMs 134 transmit a notification to the device(s) to trigger haptic feedback thereon and the haptic feedback is provided.

In step 1114, device(s) 114 complete the pre-staged transaction(s) on ATMs 134.

Figure 12:
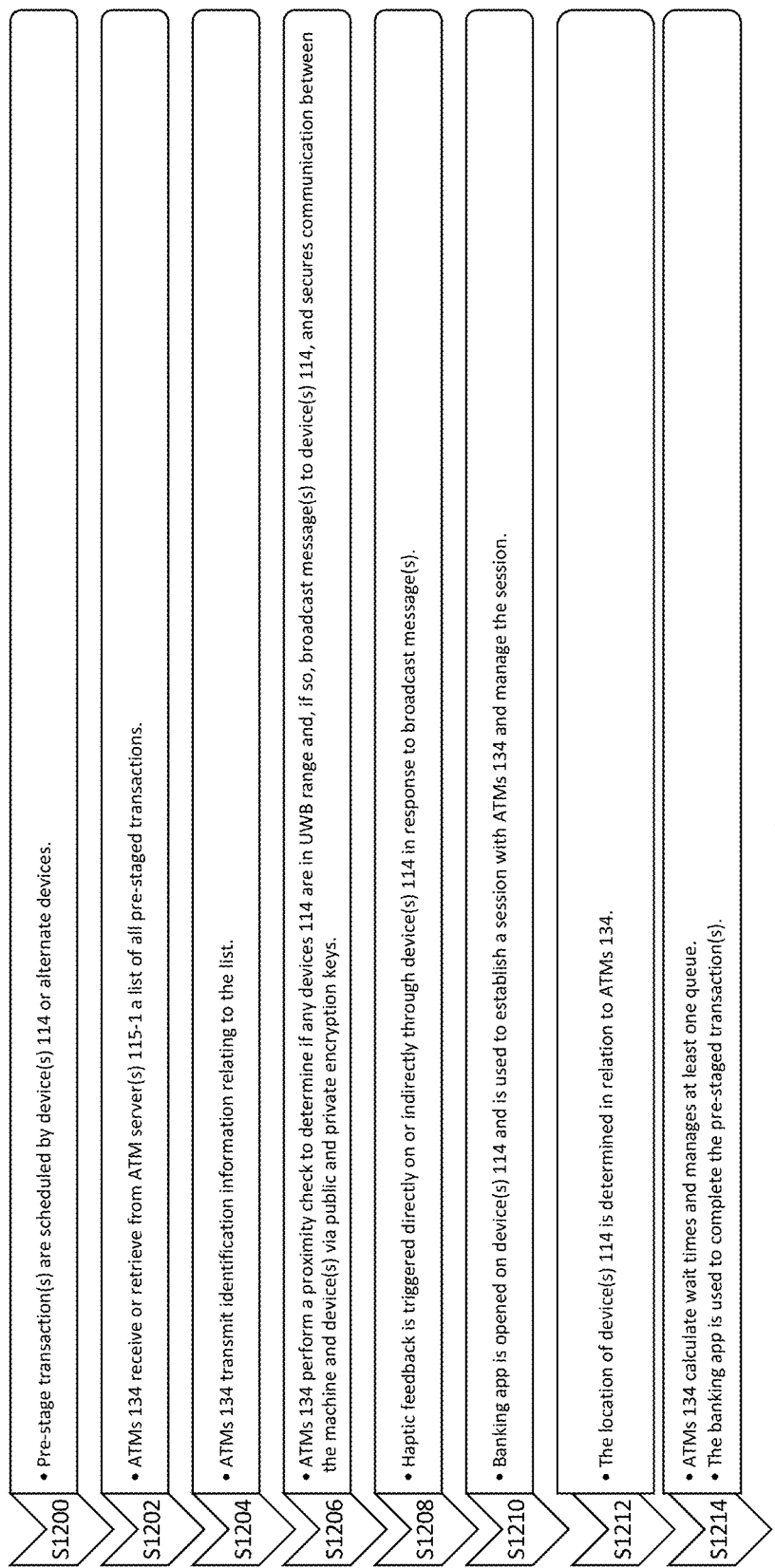
FIGS. 12 and 13 show exemplary steps to implement certain aspects of the present disclosure in UWB ATM transaction pre-staging method(s) for use with one or more UWB-enabled devices.
Figure 13:
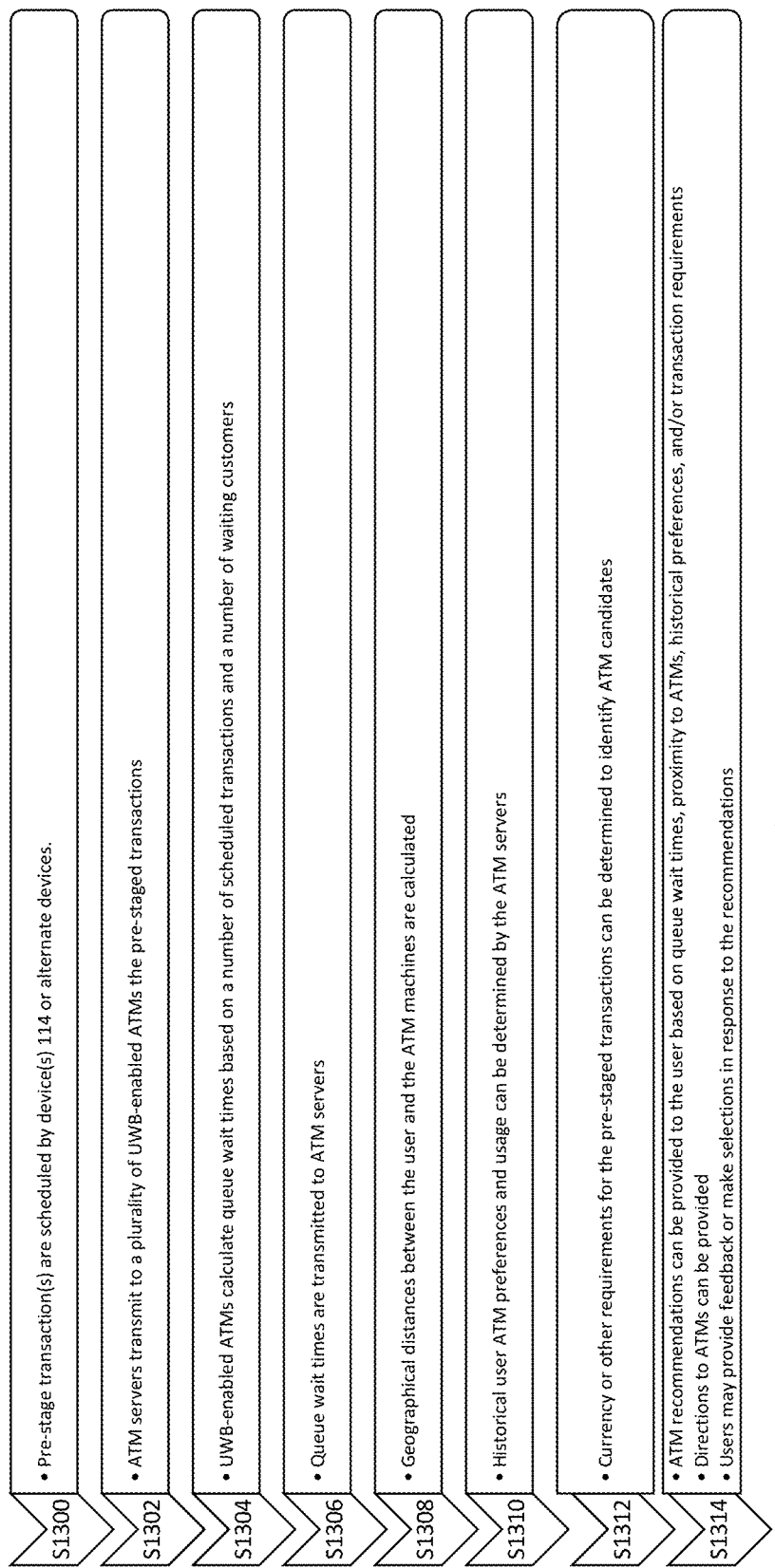

FIG. 12 shows exemplary steps to implement certain aspects of the present disclosure in UWB ATM transaction pre-staging method(s) for use with one or more UWB-enabled devices.

In step 1200, pre-stage transaction(s) are scheduled by device(s) 114 or alternate devices.

In step 1202, ATMs 134 receive or retrieve from ATM server(s) 115-1 a list of all pre-staged transactions.

In step 1204, ATMs 134 transmit identification information relating to the list.

In step 1206, ATMs 134 perform a proximity check to determine if any devices 114 are in UWB range and, if so, broadcast message(s) to device(s) 114, and secure communication between the machine and device(s) via public and private encryption keys.

In step 1208, haptic feedback is triggered directly on or indirectly through device(s) 114 in response to broadcast message(s).

In step 1210, a banking app is opened automatically or manually on device(s) 114 and is used to establish a session with ATMs 134 and manage the session.

In step 1212, the location of device(s) 114 is determined in relation to ATMs 134.

In step 1214, ATMs 134 calculate wait times and manages at least one queue. And the banking app is used to complete the pre-staged transaction(s).

Although the present technology has been described in detail for the purpose of illustration based on what is currently considered to be the most practical and preferred implementations, it is to be understood that such detail is solely for that purpose and that the technology is not limited to the disclosed implementations, but, on the contrary, is intended to cover modifications and equivalent arrangements that are within the spirit and scope of the appended claims. For example, it is to be understood that the present technology contemplates that, to the extent possible, one or more features of any implementation can be combined with one or more features of any other implementation.

What is claimed is:

1. A queue management ultra-wideband (UWB) automated teller machine (ATM) transaction pre-staging method for use with an ATM server, at least one UWB-enabled wireless portable electronic device, and a plurality of UWB-enabled ATMs at known ATM locations, said method comprising the steps of:
  i) pre-staging, by at least one UWB-enabled wireless portable electronic device with the ATM server, at least one pre-staged transaction;

ii) transmitting, by the ATM server to the plurality of UWB-enabled ATMs, the at least one pre-staged transaction;

iii) calculating, by the plurality of UWB-enabled ATMs, queue wait times based on a number of scheduled transactions and a number of waiting customers in real-time;

iv) transmitting, by the plurality of UWB-enabled ATMs to the ATM server, the queue wait times;

v) transmitting a UWB polling message from a UWB initiator transceiver in said at least one of the plurality of UWB-enabled ATMs to a UWB responder transceiver in said at least one UWB-enabled wireless portable device; receiving, by the UWB initiator transceiver in said at least one of the plurality of UWB-enabled ATMs, a reply from UWB responder transceiver in said at least one UWB-enabled wireless portable device, determining, by said at least one of the plurality of UWB-enabled ATMs, a ToF measurement based on the UWB poling message and reply; performing a proximity analysis, by at least one of the plurality of UWB-enabled ATMs based at least in part on the time-of-flight (ToF) measurement, and calculating the UWB-enabled wireless portable device location in real-time;

vi) transmitting, by said at least one of the plurality of UWB-enabled ATMs to the ATM server, the UWB-enabled wireless portable device location in real-time;

vii) determining, by the ATM server, at least one geographical distance between the UWB-enabled wireless portable device location and the plurality of UWB-enabled ATMs in real-time;

viii) determining, by the ATM server, historical usage preferences for the at least one UWB-enabled wireless portable electronic device and the plurality of UWB-enabled ATMs; and ix) generating, by the ATM server, at least one recommendation for which of said plurality of UWB-enabled ATMs to use based on the queue wait times, the UWB-enabled wireless portable device location, the determined geographical distance between the at least one UWB enabled wireless portable device location and ATM locations, and the historical usage preferences.

2. A queue management ultra-wideband (UWB) automated pre-staged transaction system for use with at least one UWB-enabled wireless portable electronic device that generates at least one pre-staged transaction, said system comprising:

a) a first UWB-enabled automated teller machine (ATM) having:
  i) at least one first ATM processor,
  ii) at least one first ATM communication interface communicatively coupled to the at least one first ATM processor,
  iii) a first ATM UWB transceiver communicatively coupled to the at least one first ATM communication interface;
  iv) a first ATM memory communicatively coupled to the at least one first ATM communication interface, said first ATM memory storing first ATM computer-readable instructions that, when executed by the at least one first ATM processor, cause the first ATM machine to:
    (1) receive, by the at least one first ATM communication interface said at least one pre-staged transaction;
    (2) store, in the first ATM memory, said at least one pre-staged transaction;
    (3) store, in the first ATM memory, a first list of other scheduled transactions for said first ATM;
    (4) calculate, by the at least one first ATM processor, a first queue wait time based the first list of other scheduled transactions;
    (5) prioritize, by the at least one first ATM processor, the at least one pre-staged transaction and the first list of other scheduled transactions;
    (6) store, in the first ATM memory, the first queue wait time;
    (7) transmit, from the at least one first ATM communication interface to an ATM server, the first queue wait time;
    (8) transmitting a UWB polling message from a UWB initiator transceiver in said at least one of the plurality of UWB-enabled ATMs to a UWB responder transceiver in said at least one UWB-enabled wireless portable device; receiving, by the UWB initiator transceiver in said at least one of the plurality of UWB-enabled ATMs, a reply from UWB responder transceiver in said at least one UWB-enabled wireless portable device, determining, by said at least one of the plurality of UWB-enabled ATMs, a ToF measurement based on the UWB poling message and reply; performing a proximity analysis, by at least one of the plurality of UWB-enabled ATMs based at least in part on the time-of-flight (ToF) measurement, and calculating the at least one UWB-enabled wireless portable device location in real-time;

b) a second UWB-enabled ATM having:
  i) at least one second ATM processor,
  ii) at least one second ATM communication interface communicatively coupled to the at least one second ATM processor,
  iii) a second ATM UWB transceiver communicatively coupled to the at least one second ATM communication interface;
  iv) a second ATM memory communicatively coupled to the at least one second ATM communication interface, said second ATM memory storing second ATM computer-readable instructions that, when executed by the at least one second ATM processor, cause the second ATM machine to:
    (1) receive, by the at least one second ATM communication interface said at least one pre-staged transaction;
    (2) store, in the second ATM memory, said at least one pre-staged transaction;
    (3) store, in the second ATM memory, a second list of other scheduled transactions for said second ATM;
    (4) calculate, by the at least one second ATM processor, a second queue wait time based the second list of other scheduled transactions;
    (5) prioritize, by the at least one second ATM processor, the at least one pre-staged transaction and the second list of other scheduled transactions;
    (6) store, in the second ATM memory, the second queue wait time;
    (7) transmit, from the at least one second ATM communication interface to the ATM server, the second queue wait time;

c) an ATM server having:
  i) at least one server processor,
  ii) at least one server communication interface communicatively coupled to the at least one server processor;
  iii) a server memory communicatively coupled to the at least one server communication interface, said server memory storing server computer-readable instructions that, when executed by the at least one server processor, cause the ATM server to:
    (1) receive, by the at least one server communication interface from the at least one first ATM communication interface and the at least one second ATM communication interface, the first queue wait time and the second queue wait time;
    (2) store, by the at least one server processor in the server memory, the first queue wait time and the second queue wait time;
    (3) receive, by the at least one server communication interface from the at least one wireless portable electronic device said at least one pre-staged transaction;
    (4) store, by the at least one server processor in the server memory, said at least one pre-staged transaction;
    (5) determine, by the at least one server processor, at least one geographical distance between the at least one UWB enabled wireless portable device location and the first and second UWB enabled ATM, historical usage preferences for the at least one UWB-enabled wireless portable electronic device and the first and second UWB-enabled ATMs, and determine, an ATM prioritization based on the first queue wait time the second queue wait time, the at least one UWB enabled wireless portable device location, the at least one geographical distance between the at least one UWB enabled wireless portable device location and the first and second UWB enabled ATMs, and historical usage of the first ATM and the second ATM;
    (6) transmit, by the at least one server communication interface to the at least one UWB-enabled wireless portable electronic device, the ATM prioritization in order to recommend which of said first ATM and said second ATM has a shorter wait time.

3. The queue management UWB automated pre-staged transaction system of claim 2 wherein the first UWB-enabled ATM determines a first number of customers waiting at the first ATM and the second UWB-enabled ATM determines a second number of customers waiting at the second ATM.

4. The queue management UWB automated pre-staged transaction system of claim 3 wherein the first wait time is further calculated based on the first number of customers waiting at the first ATM and the second wait time is calculated based on the second number of customers waiting at the second ATM.

5. The queue management UWB automated pre-staged transaction system of claim 4 in which the ATM prioritization is based on the first queue wait time, the second queue wait time, and geographical proximities of the at least one UWB-enabled wireless portable electronic device to the first ATM and the second ATM.

6. The queue management UWB automated pre-staged transaction system of claim 4 in which the ATM prioritization is based on the first queue wait time, the second queue wait time, geographical proximities of the at least one UWB-enabled wireless portable electronic device to the first ATM and the second ATM, and currency resources available at the first ATM and the second ATM that correspond to requirements for said at least one pre-staged transaction.

7. The queue management UWB automated pre-staged transaction system of claim 4 in which the ATM prioritization is based on the first queue wait time, the second queue wait time, geographical proximities of the at least one UWB-enabled wireless portable electronic device to the first ATM and the second ATM, currency resources available at the first ATM and the second ATM that correspond to requirements for said at least one pre-staged transaction, and historical usage of the first ATM and the second ATM.

8. The queue management UWB automated pre-staged transaction system of claim 4 in which the first queue wait time and the second queue wait time are updated in real-time.

9. The queue management UWB automated pre-staged transaction system of claim 7 in which the geographical proximities are updated in real-time.

10. The queue management UWB automated pre-staged transaction system of claim 9 in which at least one updated ATM prioritization is transmitted to said at least one UWB-enabled wireless portable electronic device based on the updated geographical proximities.

11. A queue management ultra-wideband (UWB) ATM transaction pre-staging method for use with at least one UWB-enabled wireless portable electronic device comprising the steps of:
  a) registering, by a server, unique user identification and, for each said at least one UWB-enabled wireless portable electronic device, a unique hardware identifier;
  b) generating, by the server, a private encryption key and public encryption key corresponding to said unique user identification;
  c) transmitting, by the server to the at least one UWB-enabled wireless portable electronic device, the private encryption key and the public encryption key;
  d) authenticating, by a server in communication with said at least one UWB-enabled wireless portable electronic device, a pre-stage transaction session;
  e) initiating, by said at least one UWB-enabled wireless portable electronic device, at least one pre-staged transaction;
  f) transmitting, from said at least one UWB-enabled wireless portable electronic device to a server, said at least one pre-staged transaction;
  g) processing, by the server, said at least one pre-staged transaction;
  h) transmitting, by the server to a plurality of UWB-enabled ATMs, said at least one pre-staged transaction;
  i) calculating, by the plurality of UWB enabled ATMs, queue wait times based on a number of scheduled transactions and a number of waiting customers in real-time, determining, by the ATM server, historical usage preferences for the at least one UWB-enabled wireless portable electronic device and the plurality of UWB-enabled ATMs, determine, by the ATM server, a distance between the at least one UWB-enabled wireless portable electronic device and the one or more preferred ATM locations, and identifying, by the server, one or more preferred ATM locations for executing said at least one pre-staged transaction based on queue wait times at said one or more preferred ATM locations, calculated at least one UWB enabled wireless portable device location, the at least one geographical distance between the at least one UWB enabled wireless portable device location and the first and second UWB enabled ATMs, and the historical usage preferences for the at least one UWB-enabled wireless portable electronic device;

j) transmitting, by the server to the at least one UWB-enabled wireless portable electronic device, the one or more preferred ATM locations;

k) detecting, by one of said plurality of UWB-enabled ATMs, the at least one UWB-enabled wireless portable electronic device that was registered by the server based on said unique hardware identifier transmitting a UWB polling message from a UWB initiator transceiver in said at least one of the plurality of UWB-enabled ATMs to a UWB responder transceiver in said at least one UWB-enabled wireless portable device; receiving, by the UWB initiator transceiver in said at least one of the plurality of UWB-enabled ATMs, a reply from UWB responder transceiver in said at least one UWB-enabled wireless portable device, determining, by said at least one of the plurality of UWB-enabled ATMs, a ToF measurement based on the UWB poling message and reply; performing a proximity analysis, by at least one of the plurality of UWB-enabled ATMs based at least in part on the time-of-flight (ToF) measurement and calculating the at least one UWB-enabled wireless portable device location in real-time;

l) identifying, by the one of said plurality of UWB-enabled ATMs, the unique user identification based on the unique hardware identifier;

m) identifying, by the one of said plurality of UWB-enabled ATMs, the at least one pre-staged transaction corresponding to the unique user identification;

n) providing, by the at least one UWB-enabled portable electronic device in response to receipt of the pre-staged transaction notification, haptic feedback directly on or indirectly through the at least one UWB-enabled wireless portable electronic device; and o) completing, through the at least one UWB-enabled wireless portable electronic device in communication with one of said plurality of UWB-enabled ATMs, the at least one pre-staged transaction through utilization of the private encryption key and the public encryption key.

12. The queue management UWB ATM transaction pre-staging method of claim 11 wherein the identification of the one or more preferred ATM locations further comprises:
calculating a distance between the at least one UWB-enabled wireless portable electronic device and the one or more preferred ATM locations.

13. The queue management UWB ATM transaction pre-staging method of claim 11 wherein the identification of the one or more preferred ATM locations further comprises:
calculating a preference score based a frequency and number of visits to said one or more preferred ATM locations.

14. The queue management UWB ATM transaction pre-staging method of claim 11 wherein the queue wait times are determined based on:
a) a users present calculation for the one or more preferred ATM locations; and
b) a scheduled transactions calculation for the one or more preferred ATM locations.

15. The queue management UWB ATM transaction pre-staging method of claim 12 wherein the identification of the one or more preferred ATM locations further comprises:
calculating a preference score based a frequency and number of visits to said one or more preferred ATM locations.

16. The queue management UWB ATM transaction pre-staging method of claim 15 wherein the queue wait times are determined based on:
a) a users present calculation for the one or more preferred ATM locations; and
b) a scheduled transactions calculation for the one or more preferred ATM locations.

17. The queue management UWB ATM transaction pre-staging method of claim 16 further comprises the step of:
executing, on the at least one UWB-enabled wireless portable electronic device, a banking app, which is used in said initiating of said at least one pre-staged transaction and in said completing of said at least one pre-staged transaction.

18. The queue management UWB ATM transaction pre-staging method of claim 16 wherein the at least one UWB-enabled wireless portable electronic device is a smart phone and the haptic feedback is provided directly on the smart phone.

19. The queue management UWB ATM transaction pre-staging method of claim 16 wherein the at least one UWB-enabled wireless portable electronic device is a wearable device and the haptic feedback is provided directly on the wearable device.

* * * * *